(12) United States Patent
Iwata

(10) Patent No.: US 6,532,496 B1
(45) Date of Patent: Mar. 11, 2003

(54) INFORMATION PROCESSING SYSTEM

(75) Inventor: Nobuo Iwata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/292,943

(22) Filed: Apr. 16, 1999

(30) Foreign Application Priority Data

Apr. 20, 1998 (JP) .......................................... 10-108993
Apr. 16, 1999 (JP) .......................................... 11-108892

(51) Int. Cl.⁷ .............................................. G06F 13/00
(52) U.S. Cl. ...................................... 709/245; 709/229
(58) Field of Search .............................. 358/256, 434, 358/438; 709/223, 229, 245

(56) References Cited

U.S. PATENT DOCUMENTS 5,459,579 A * 10/1995 Hu et al. .................... 358/296
5,920,404 A * 7/1999 Weiser ........................ 358/434
5,982,507 A * 11/1999 Weiser et al. ................ 358/438

* cited by examiner

*Primary Examiner*—N. Le
*Assistant Examiner*—Walter Benson
(74) *Attorney, Agent, or Firm*—Oliff & Berridge, PLC

(57) ABSTRACT

An information processing system which has a plurality of hardware modules M1 to M3, an electronic mail transmission unit SM1 being installed in at least one of the hardware modules M1–M3 for transmitting electronic mail via a LAN, an electronic mail transmission request unit SR1 to SR3 each being installed in each of the hardware modules M1–M3 for transmitting a part or all of electronic mail prepared in the corresponding hardware module to the electronic mail transmission unit SM1, and a communication unit each being installed in each of the hardware modules M1–M3 for transferring data in a part or all of electronic mail in each hardware module and between the hardware modules.

18 Claims, 20 Drawing Sheets

INFORMATION PROCESSING SYSTEM

BACKGROUND OF THE INVENTION

This invention relates to an information processing system such as a complex machine and more particularly to an information processing system made up of a plurality of hardware modules.

Hitherto, an art for transmitting fault information in an information processing system by facsimile has been known as disclosed in JP-A-5-167714. The art provides the merit of saving the user the trouble of calling a maintenance center when a fault occurs in the information processing system. Moreover, a maintenance person can previously determine the cause of the fault as compared with the case where the maintenance person goes to the field and collects the fault information, thus the maintenance person can provide necessary parts required for maintenance before he or she goes to the field; prompt maintenance work is enabled.

However, the art uses facsimile communication and thus has a disadvantage in that reliable transmission cannot be executed if the communication line is busy. Since a protocol for transmitting and receiving binary data that can be processed by the information processing system is not standardized for facsimile communication, it is difficult to transmit and receive maintenance information as binary data.

An art for transmitting fault information in an information processing system by electronic mail has also been known as disclosed in JP-A-8-286990. According to the art, sent electronic mail is stored in a mail server, thus the disadvantage in that information cannot be transmitted because the line is busy as in use of facsimile transmission described above is not involved in the art. A technique of adding binary data that can be processed by information processing systems to electronic mail like MIME (multipurpose Internet mail extensions) is in widespread use and it is easy to transfer such data by electronic mail.

An information processing system having complex functions such as a complex machine is made up of a plurality of hardware modules. Such an information processing system in a related art takes an internal configuration as shown in FIG. 22. That is, as shown here, the information processing system gets machine information from a hardware module having no network interface (module B) and converts the machine information into an electronic mail format and transmits the resultant information by a hardware module having a network interface (module A).

Thus, at the time of developing the module A, it is necessary to make it possible to process the machine information gotten from the module B in the format thereof. Therefore, the design period and the development period of the module A are prolonged. To extend the function of the module B, the function of the module A need to be changed.

An information processing system which receives electronic mail and performs various types of processing is also possible. For example, it is possible that software or a software patch is received and the software of the information processing system is updated in response to the received software or software patch. Hitherto, such an information processing system has needed to take an internal configuration as shown in FIG. 23. That is, as shown here, the information processing system receives electronic mail at a hardware module having a network interface (module A) and converts information contained in the electronic mail into a format in which the information can be transferred between modules and passes the resultant information to a hardware module having no network interface (module B).

Thus, as in the above-described information processing system, at the time of developing the module A, it is necessary to make it possible to convert information into the format of data supplied to the module B. Therefore, the design period and the development period of the module A are prolonged. To extend the function of the module B, the function of the module A need to be changed.

SUMMARY OF THE INVENTION

It is therefore an object of the invention to provide an information processing system made up of a plurality of hardware modules for transmitting machine information by electronic mail, wherein it is made possible to develop a hardware module having a network interface without considering the contents or format of machine information gotten from a hardware module having no network interface.

It is another object of the invention to provide an information processing system made up of a plurality of hardware modules for transmitting machine information by electronic mail, wherein it is made possible to extend the function of a hardware module having no network interface without extending the function of a hardware module having a network interface.

It is another object of the invention to provide an information processing system made up of a plurality of hardware modules for receiving data by electronic mail, wherein it is made possible to develop a hardware module having a network interface without considering the contents or format of data supplied to a hardware module having no network interface.

It is another object of the invention to provide an information processing system made up of a plurality of hardware modules for receiving data by electronic mail, wherein it is made possible to extend the function of a hardware module having no network interface without extending the function of a hardware module having a network interface.

To these ends, according to aspect 1, there is provided an information processing system comprising:
  a first module;
  a second module being connected to an external system via a network, the second modules being connected with the first module, wherein
  the first module comprises:
    preparation means for preparing information on the first module to be transmitted to the external system in a format in which the external system recognizes the information; and
    first transmission means for transmitting the module information on the first module prepared by the preparation means and a request for transferring the information to the external system to the second module, and
  the second module comprises:
    first transfer means for transferring the module information transmitted by the first transmission means to the external system in accordance with the transfer request.

The Network Includes the Telephone

In the invention, an electronic mail transmission request issued from the electronic mail transmission request means is sent through the communication means (first transmission means) to the electronic mail transmission means (first transmission means). That is, the electronic mail transmission request in a format common to the hardware modules is sent from the electronic mail transmission request means in the hardware module not connected to the network through the communication means to the electronic mail transmission means and is transmitted from the electronic mail transmission means to the network.

In the invention according to aspect 2, there is provided the information processing system as in aspect 1, wherein the second module further comprises:
second transmission means for transmitting address information indicating an address of the first transfer means to the first module, and the first module further comprises:
first reception means for receiving the address information transmitted by the second transmission means; and
first storage means for storing the address information received by the first reception means, and wherein the first transmission means transmits the information on the first module and a request for transferring the information to the external system to the address indicated by the address information stored in the first storage means.

In the invention, the electronic mail transmission request destination is sent from the electronic mail transmission request destination notification means (second transmission means) installed in the hardware module having the electronic mail transmission means to a different module, which then receives the electronic mail transmission request destination at the electronic mail transmission request destination notification reception means (first reception means), whereby the different hardware module can get the address of the electronic mail transmission means as the electronic mail transmission request destination. The electronic mail transmission request means references the address stored in the electronic mail transmission request destination storage means (first storage means), whereby to transmit electronic mail from a hardware module not connected to the network, the address to which an electronic mail transmission request is to be sent can be gotten automatically.

In the invention according to aspect 3, there is provided the information processing system as in aspect 1, wherein the first module further comprises:
second reception means for receiving module information and a request for transferring the information to the external system from a different module connected; and
second transfer means for transferring the module information and the request for transferring the information to the external system received by the second reception means to the second module.

In the invention, the electronic mail transmission request transmitted from the electronic mail transmission request means (second reception means; second transfer means) is transferred by the electronic mail transmission request transfer means (second transfer means) to a different hardware module and finally, electronic mail is transmitted from the electronic mail transmission means to the network.

In the invention according to aspect 4, there is provided the information processing system as in aspect 3, wherein the first module further comprises:
second transmission means for transmitting address information indicating an address of the second transfer means to the different module.

In the invention, the electronic mail transmission request destination notification means (second transfer means) receives the electronic mail transmission request destination, whereby the address of the electronic mail transmission means is transferred from one hardware module to another. Further, the electronic mail transmission request transfer means receives the electronic mail transmission request and transfers the received electronic mail transmission request to the request destination stored in the electronic mail transmission request destination storage means, whereby the hardware module taking charge of transferring the electronic mail transmission request informs the adjacent hardware module that the hardware module taking charge of transferring becomes the destination; resultantly, electronic mail can be transferred in sequence.

In the invention according to aspect 5, there is provided the information processing system as in aspect 1, wherein the second module further comprises second storage means for storing address information indicating an address of the external system, and the first transfer means transfers the module in formation to the address indicated by the address information stored in the second storage means.

In the invention, the electronic mail transmission means transmits electronic mail to the destination stored in the first destination storage means (second storage means), so that electronic mail can be transmitted from every hardware module to a predetermined destination.

In the invention according to aspect 6, there is provided the information processing system as in aspect 1, wherein the first module further comprises third storage means for storing address information indicating an address of the external system, and the first transfer means transfers the module information to the address indicated by the address information stored in the third storage means.

In the invention, the electronic mail transmission request means makes a request for transmitting electronic mail to the destination stored in the second destination storage means (third storage means), so that electronic mail can be transmitted to a predetermined destination for each hardware module.

In the invention, an electronic mail transmission request transmitted from the electronic mail transmission request means is transferred through the communication means and the predetermined bus to the electronic mail transmission means, and is transmitted from the electronic mail transmission means to the network. That is, electronic mail prepared in a predetermined hardware module is sent on the bus to the electronic mail transmission means without passing through another hardware module; electronic mail can be transmitted without imposing a load on another hardware module.

In the invention, as the information processing system, printout, facsimile input/output, and copy can be executed and electronic mail can be transmitted to the network in the format common to the hardware modules.

In the present invention according to aspect 7, there is provided an information processing system comprising:
a first module;
a second module being connected to an external system via a network, the second module being connected with the first module, wherein the second module comprises:
third reception means for receiving processing information and a request for transferring the information to a destination module via a network; and
third transfer means for transferring the processing information received by the third reception means to the first module in accordance with the transfer request, and the first module comprises:
  processing means for performing processing based on the processing information transferred by the third transfer means.

In the invention, electronic mail sent through the network is transferred from the electronic mail transfer means (third reception means; third transfer means) to a predetermined hardware module and thus is also transferred to a hardware module having no means for connecting to the network and can be processed in the electronic mail processing means (processing means).

In the invention according to aspect 8, there is provided the information processing system as in aspect 7, wherein
  the first module further comprises:
    third transmission means for transmitting address information indicating an address of the processing means to the second module, and
  the second module further comprises:
    fourth reception means for receiving the address information transmitted by the third transmission means; and
    third storage means for storing the address information received by the fourth reception means, and wherein
  the third transfer means transfers the processing information to the address indicated by the address information stored in the third storage means.

In the invention, the address of the electronic mail processing means in the hardware module to which the received electronic mail is to be transferred is propagated to the electronic mail transfer destination notification reception means (fourth reception means from third transmission means). That is, if a hardware module not connected to the network is connected, the electronic mail transfer destination address to the hardware module is propagated to the hardware module receiving electronic mail directly from the network. The electronic mail transfer means gets the address from the quotation information stored in the electronic mail transfer destination storage means (third storage means), whereby the electronic mail transfer destination is determined and the electronic mail can be transferred to the electronic mail transfer destination.

In the invention according to aspect 9, there is provided the information processing system as in aspect 7, wherein
  the first module further comprises:
    fifth reception means for receiving the address information indicating the address of the processing means contained in a different module; and
    replacement means for replacing the address information received by the fifth reception means with the address information received by the fourth reception means, and wherein
  the third transmission means transmits the address information provided by the replacement means to the second module.

In the invention, the electronic mail transfer destination address is transferred from one hardware module to another by the electronic mail transfer destination notification transfer means (fifth reception means). Further, the electronic mail transfer means contained in a hardware module not connected to the network transfers received electronic mail to the transfer destination stored in the electronic mail transfer destination storage means, whereby the hardware module taking charge of transferring the electronic mail informs the adjacent hardware module that the hardware module taking charge of transferring becomes the destination; resultantly, electronic mail can be transferred in sequence.

In the invention, electronic mail sent through the network is received at the electronic mail transfer means and is transferred to a predetermined hardware module through the communication means connected to the predetermined bus. That is, the electronic mail transfer means can transfer electronic mail to another hardware module on the predetermined bus, thus electronic mail can be transferred without imposing a load on any other hardware module than the hardware module of the transfer destination.

In the invention, as the information processing system, printout, facsimile input/output, and copy can be executed and electronic mail sent via the network can be processed in the format common to the hardware modules.

DETAILED DESCRIPTION OF THE PREFERRED EMBODIMENTS

Referring now to the accompanying drawings, there are shown preferred embodiments of the invention.

(First Embodiment)

Figure 1:
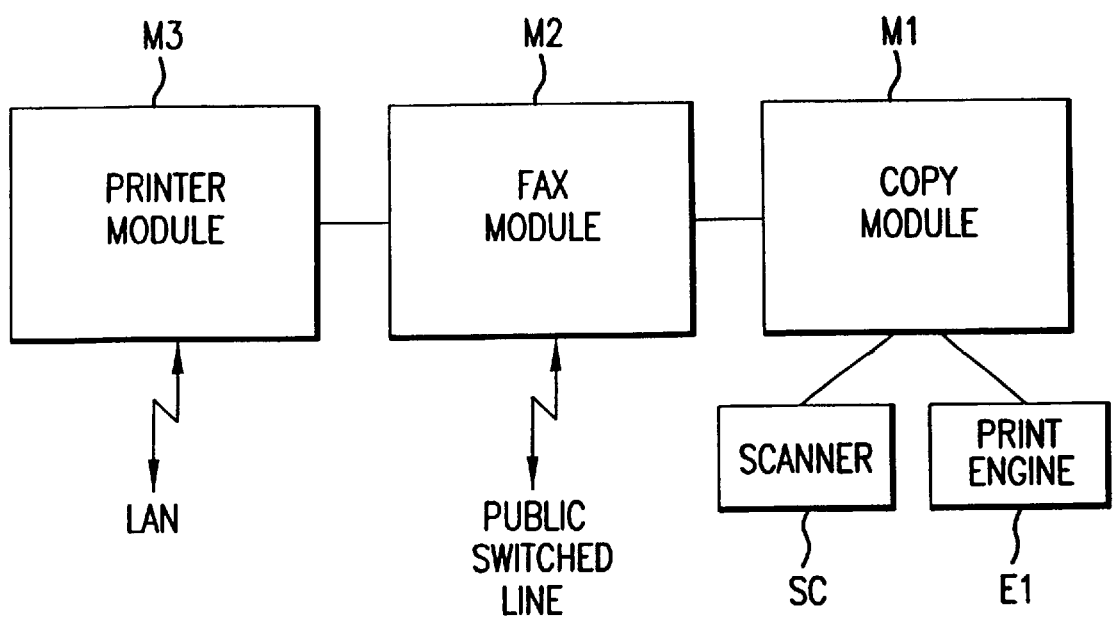
FIG. 1 is a hardware module block diagram in a first embodiment of the invention.

FIG. 1 is a hardware block diagram of an information processing system according to a first embodiment of the invention. In the embodiment, the information processing system consists mainly of the three hardware modules of a copy module M1, a fax (facsimile) module M2, and a printer module M3.

That is, the copy module M1 is a hardware module for controlling a copy function, the fax module M2 is a hardware module for controlling a fax function, and the printer module M3 is a hardware module for controlling a print function.

The copy function outputs an image read through a scanner SC by the copy module M1 to a print engine 1. The fax function transmits an image read through the scanner SC by the fax module M2 via the copy module M1 to a public switched line and outputs an image received by the fax module M2 from the public switched line to the print engine E1 via the copy module M1.

The print function converts a print command received by the printer module M3 from a LAN (local area network) into image data and outputs the image data to the print engine E1 via the fax module M2 and the copy module M1.

In such a configuration, fault information of a fault occurring in the fax module M2 is sent via the printer module M3 to the LAN. Likewise, fault information of a fault occurring in the copy module M1 is sent via the printer module M3 to the LAN.

Figure 2:
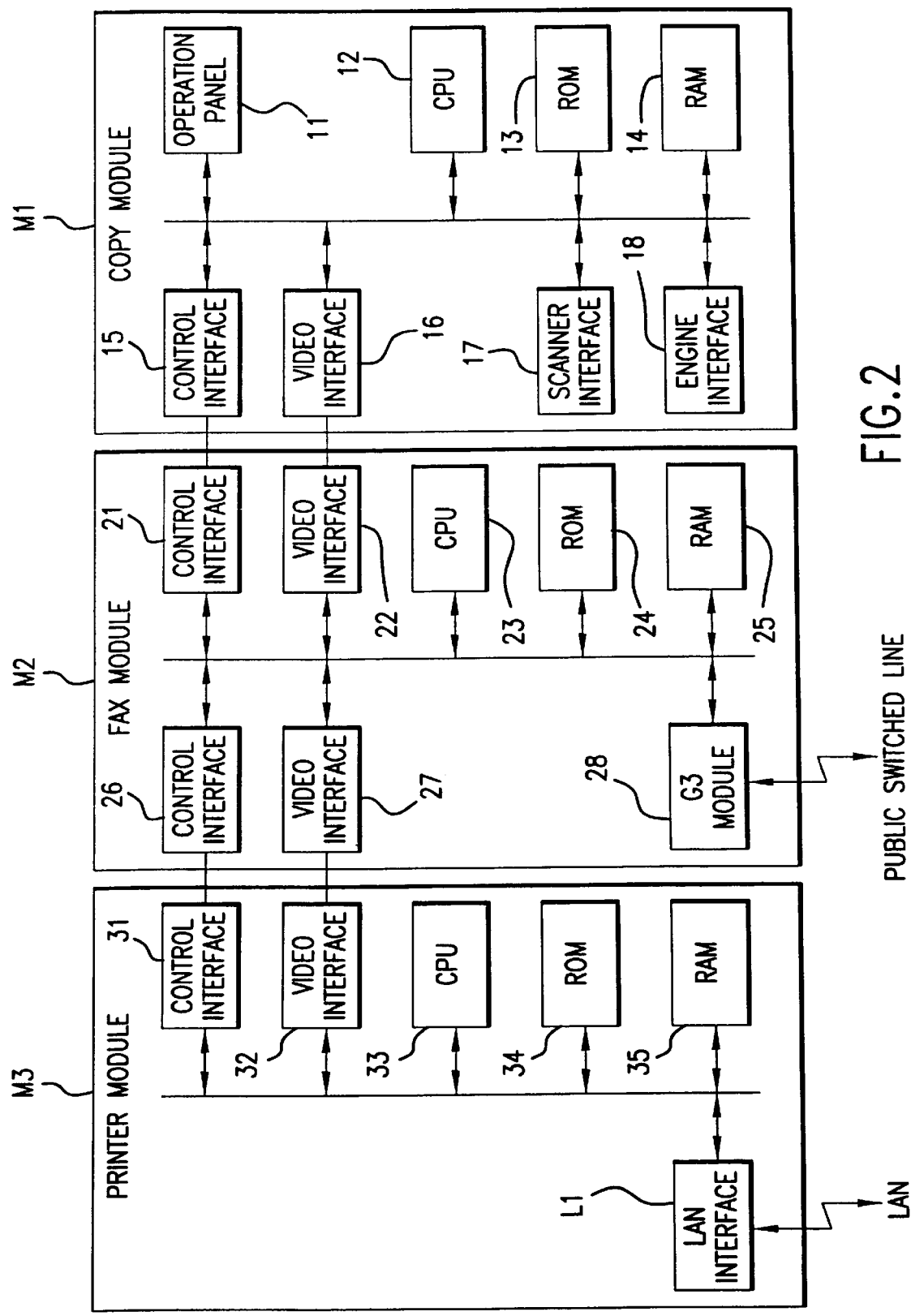
FIG. 2 is a hardware block diagram of an information processing system according to the first embodiment of the invention.

FIG. 2 is a hardware block diagram of the information processing system according to the first embodiment. That is, the copy module M1 is made up of an operation panel 11, a CPU (central processing unit) 12, ROM 13 (read-only memory), RAM 14 (random access memory), a control interface 15, a video interface 16, a scanner interface 17, and an engine interface 18.

The fax module M2 is made up of control interfaces 21 and 26, video interfaces 22 and 27, a CPU 23, ROM 24, RAM 25, and a G3 module 28.

The printer module M3 is made up of a control interface 31, a video interface 32, a CPU 33, ROM 34, RAM 35, and a LAN interface LI.

In the hardware configuration, the copy module M1 and the fax module M2 are connected by the control interfaces 15 and 21 and the video interfaces 16 and 22 and the fax module M2 and the printer module M3 are connected by the control interfaces 26 and 31 and the video interfaces 27 and 32.

The scanner interface 17 of the copy module M1 reads an image from the scanner SC. The engine interface 18 sends image data to the print engine E1.

The CPUs 12, 23, and 33 execute software in their corresponding ROMs 13, 24, and 34. The RAMs 14, 25, and 35 store software work data.

Through the operation panel 11, various settings are made for the information processing system. The G3 module 28 is connected to the public switched line for executing fax communication. The LAN interface LI is connected to the LAN for communicating with external systems of a computer, etc., connected to the LAN.

In the configuration, the ROMs 13, 24, and 34 may be electrically erasable (reprogrammable) ROMs such as flash ROM.

In the configuration, image data is transferred from one module to another on the video interfaces 16, 22, 27, and 32. Various pieces of information other than image data are transferred from one module to another on the control interfaces 15, 21, 26, and 31.

In the configuration, the control interface 15 and the video interface 16 are provided as physically separate interfaces, but may be one physical medium provided as logically separate interfaces. For example, to conform to IEEE 1394 standard, image data may be transferred in an isochronous mode guaranteeing the transfer rate and control data may be transferred in an asynchronous mode.

Figure 3:
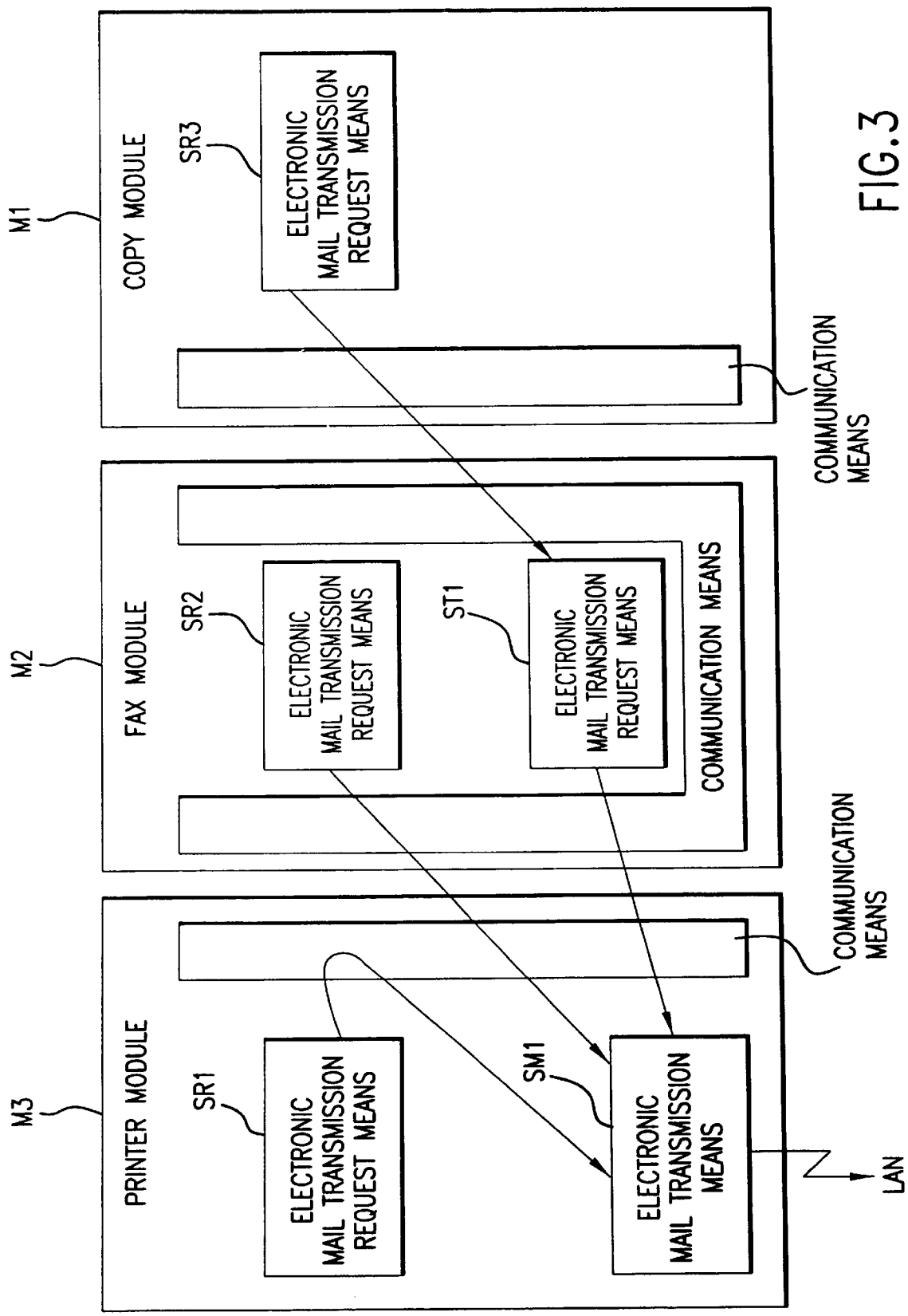
FIG. 3 is a software block diagram of the information processing system according to the first embodiment of the invention.

FIG. 3 is a software block diagram of the information processing system according to the first embodiment. That is, the copy module M1 comprises electronic mail transmission request means SR3 and communication means, the fax module M2 comprises electronic mail transmission request means SR2, electronic mail transmission request transfer means ST1, and communication means, and the printer module M3 comprises electronic mail transmission request means SR1, electronic mail transmission means SM1, and communication means.

The electronic mail transmission request means SR1, SR2, or SR3 transmits data of a part or all of electronic mail prepared in the module including the means SR1, SR2, or SR3 to the electronic mail transmission means SM1 contained in the printer module M3.

The electronic mail transmission request transfer means ST1 in the fax module M2 transfers an electronic mail transmission request transmitted from the electronic mail transmission request means SR3 in the copy module M1 to the electronic mail transmission means SM1 in the printer module M3.

The electronic mail transmission means SM1 in the printer module M3 receives electronic mail transmission requests sent from the electronic mail transmission request means SR1, SR2, and SR3 and transmits electronic mail to the LAN.

That is, in the embodiment, only the printer module M3 is connected to the network (LAN) and the fax module M2 is connected to the printer module M3 and the copy module M1 is connected to the fax module M2. Therefore, electronic mail prepared in the printer module M3 is sent through the communication means thereof to the electronic mail transmission means SM1 from which it is transmitted to the LAN.

Electronic mail prepared in the fax module M2 adjacent to the printer module M3 is sent from the communication means thereof through the communication means of the printer module M3 to the electronic mail transmission means SM1 from which it is transmitted to the LAN.

Further, electronic mail prepared in the copy module M1 adjacent to the fax module M2 not connected to the network is sent from the communication means thereof through the communication means of the fax module M2 to the electronic mail transmission request transfer means ST1, then is transferred from the communication means of the fax module M2 through the communication means of the printer module M3 to the electronic mail transmission means SM1 from which it is transmitted to the LAN.

Since electronic mail prepared in each module is thus transferred as the format common to the modules, the modules can be developed without considering the data format of any other module.

Figure 4:
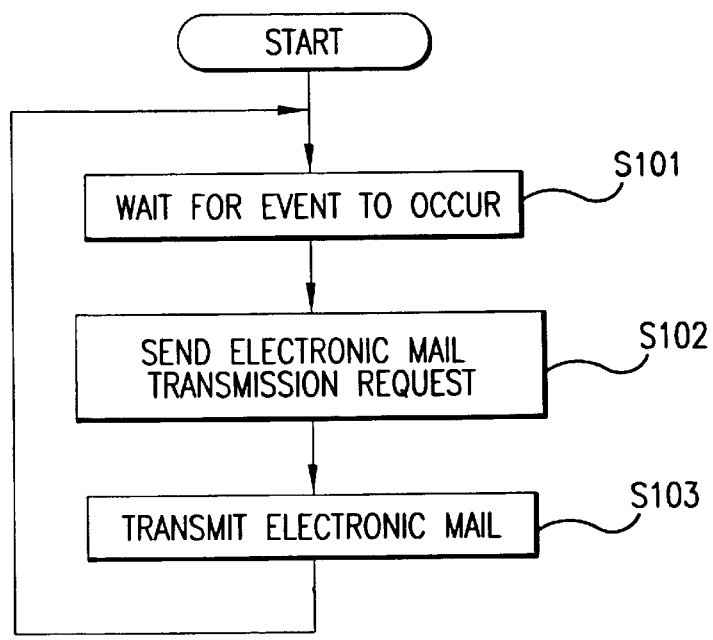
FIG. 4 is an operation flowchart in the first embodiment of the invention (No. 1)

FIG. 4 is an operation flowchart for transmitting electronic mail from the printer module or the fax module in the information processing system according to the first embodiment. The operation will be discussed with reference to the flowchart. In the description to follow, the reference numerals not shown in FIG. 4 are based on those previously described with reference to FIG. 3.

First, the electronic mail transmission request means (SR1 or SR2) waits for an event to occur as a trigger for transmitting electronic mail such as fault occurrence at step S101.

Next, when such an event occurs, the electronic mail transmission request means (SR1 or SR2) transmits an electronic mail transmission request through the communication means to the electronic mail transmission means SM1 at step S102. The electronic mail transmission means SM1 receives the electronic mail transmission request and transmits electronic mail to the LAN at step S103.

The electronic mail transmission request consists of a command as a request for transmitting electronic mail and data transmitted by electronic mail. In fact, it maybe separated into a plurality of messages for transmission. The means for detecting an event such as fault occurrence and the electronic mail transmission request means may be formed separately.

A method of using RS-232C, SLIP (serial line protocol), and TCP/IP in combination or the like is possible as a specific example of the communication means. IEEE 1284 standard can also be used in place of RS-232C. IEEE 1394 standard and SBP-2 (serial bus protocol-2) can also be used in combination instead of RS-232C.

Basically, any protocol may be used if it enables the hardware modules to communicate with each other. A protocol enabling a plurality of connections to be logically made like TCP/IP is used, whereby it is made possible to transfer information in any other protocol than electronic mail, for example, HTTP (hyper text transfer protocol), etc., in parallel.

IEEE 802.2 standard may be used instead of TCP/IP. The above-mentioned SLIP is a protocol enabling TCP/IP to be installed on a two-way protocol such as RS-232C. PPP (point to point protocol) may be used in place of SLIP.

In the embodiment, the loopback of the communication means also used for communicating from the fax module M2 is used for the electronic mail transmission request means SR1 and the electronic mail transmission means SM1 in the printer module M3 to communicate with each other. However, communication means different from that used for communicating from the fax module M2 maybe used for the electronic mail transmission request means SR1 and the electronic mail transmission means SM1 in the printer module M3 to communicate with each other.

In fact, the electronic mail transmission means SM1 may transmit a message for making a request for transmitting electronic mail to a nearby mail server.

Figure 5:
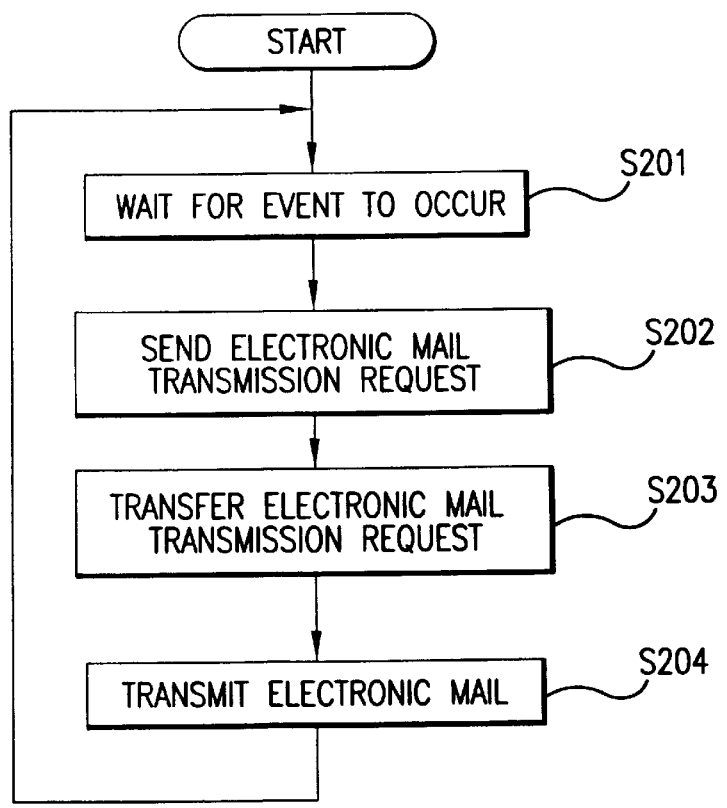
FIG. 5 is an operation flowchart in the first embodiment of the invention (No. 2)

FIG. 5 is an operation flowchart for transmitting electronic mail from the copy module in the information processing system according to the first embodiment. The operation will be discussed with reference to the flowchart. In the description to follow, the reference numerals not shown in FIG. 5 are based on those previously described with reference to FIG. 3.

First, the electronic mail transmission request means SR3 waits for an event to occur as a trigger for transmitting electronic mail such as fault occurrence at step S201. When such an event occurs, the electronic mail transmission request means SR3 transmits an electronic mail transmission request through the communication means to the electronic mail transmission means SM1 at step S202.

Next, the electronic mail transmission means SM1 receives the electronic mail transmission request and transmits the received electronic mail transmission request to the electronic mail transmission means SM1 at step S203. The electronic mail transmission means SM1 receives the electronic mail transmission request and transmits electronic mail to the LAN at step S204.

In the embodiment, the information processing system is connected to the LAN. However, in place of the LAN interface LI, a modem may be used to communicate with an external system such as a computer over a public switched line.

Electronic mail may be sent from the G3 module 28 in the fax module M2. A G4 module may be provided in place of or in addition to the G3 module.

In the embodiment, the adjacent hardware modules are connected in a tandem way, but the hardware modules may have a large number of contacts.

Figure 6:
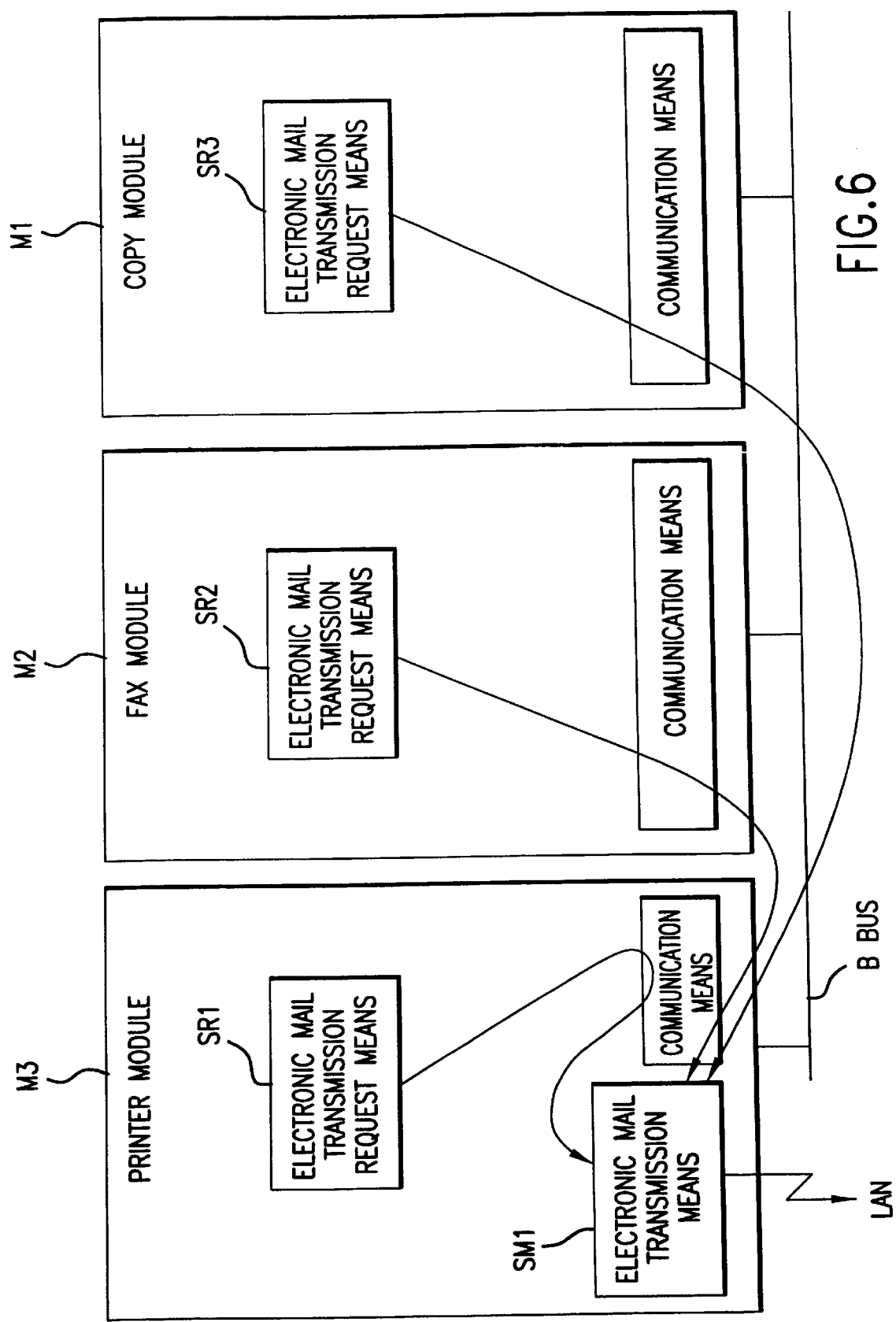
FIG. 6 is a software block diagram to show a first modified example of the first embodiment of the invention.

As shown in FIG. 6, the hardware modules of the copy module M1, the fax module M2, and the printer module M3 may be connected by a bus B.

In this case, the intermediate hardware module (in this case, the fax module M2) does not require the electronic mail transmission request transfer means for transferring electronic mail. That is, the hardware modules can send electronic mail on the bus B to the electronic mail transmission means SM1 and it is made possible to eliminate the load on the intermediate hardware module in electronic mail transfer.

Figure 7:
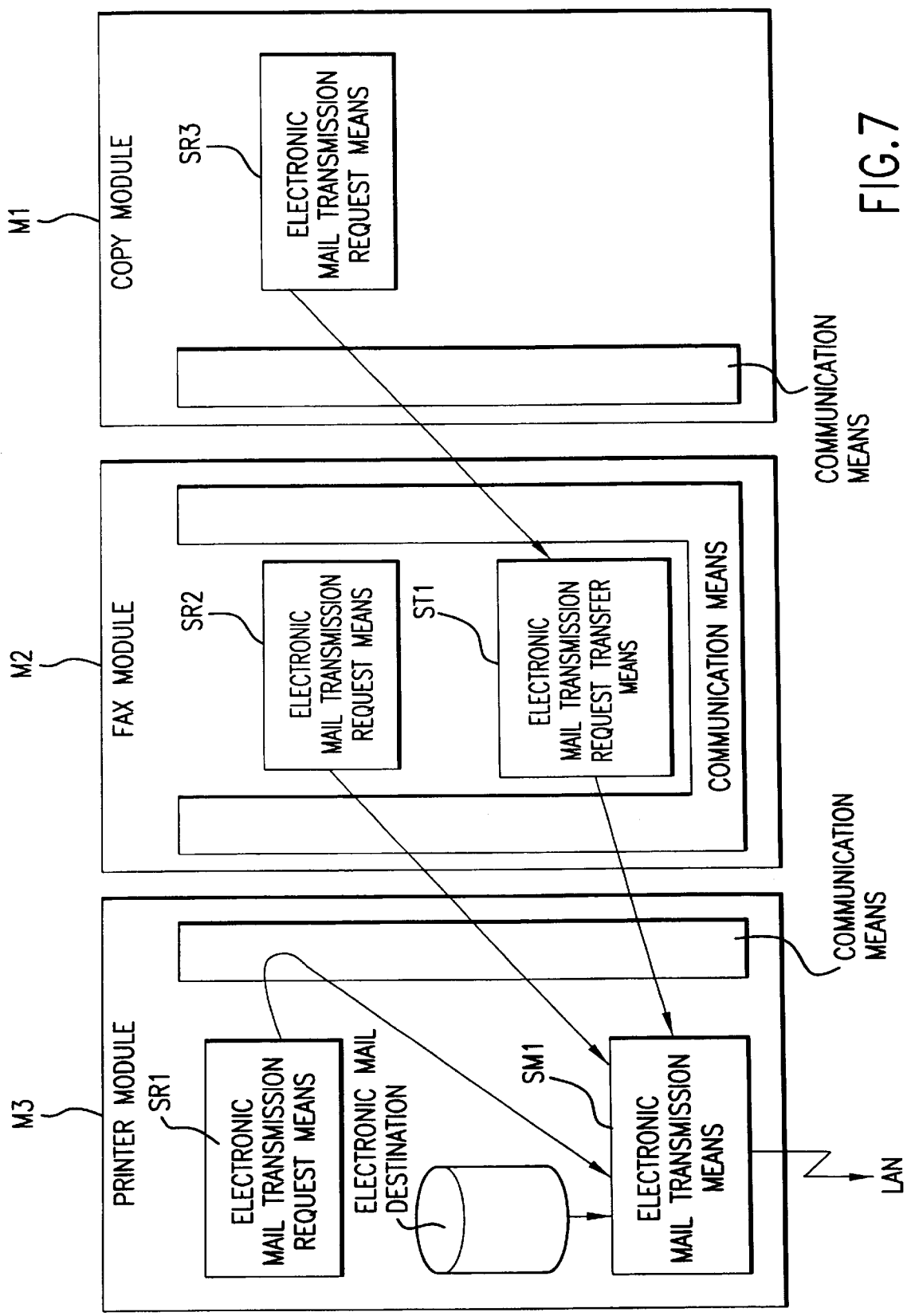
FIG. 7 is a software block diagram to show a second modified example of the first embodiment of the invention.

In the embodiment, as shown in FIG. 7, an electronic mail destination may be stored in the electronic mail transmission means SM1 and electronic mail may be transmitted to the electronic mail destination stored in the electronic mail transmission means SM1. In this case, the electronic mail destination need not be contained in an electronic mail transmission request.

Figure 8:
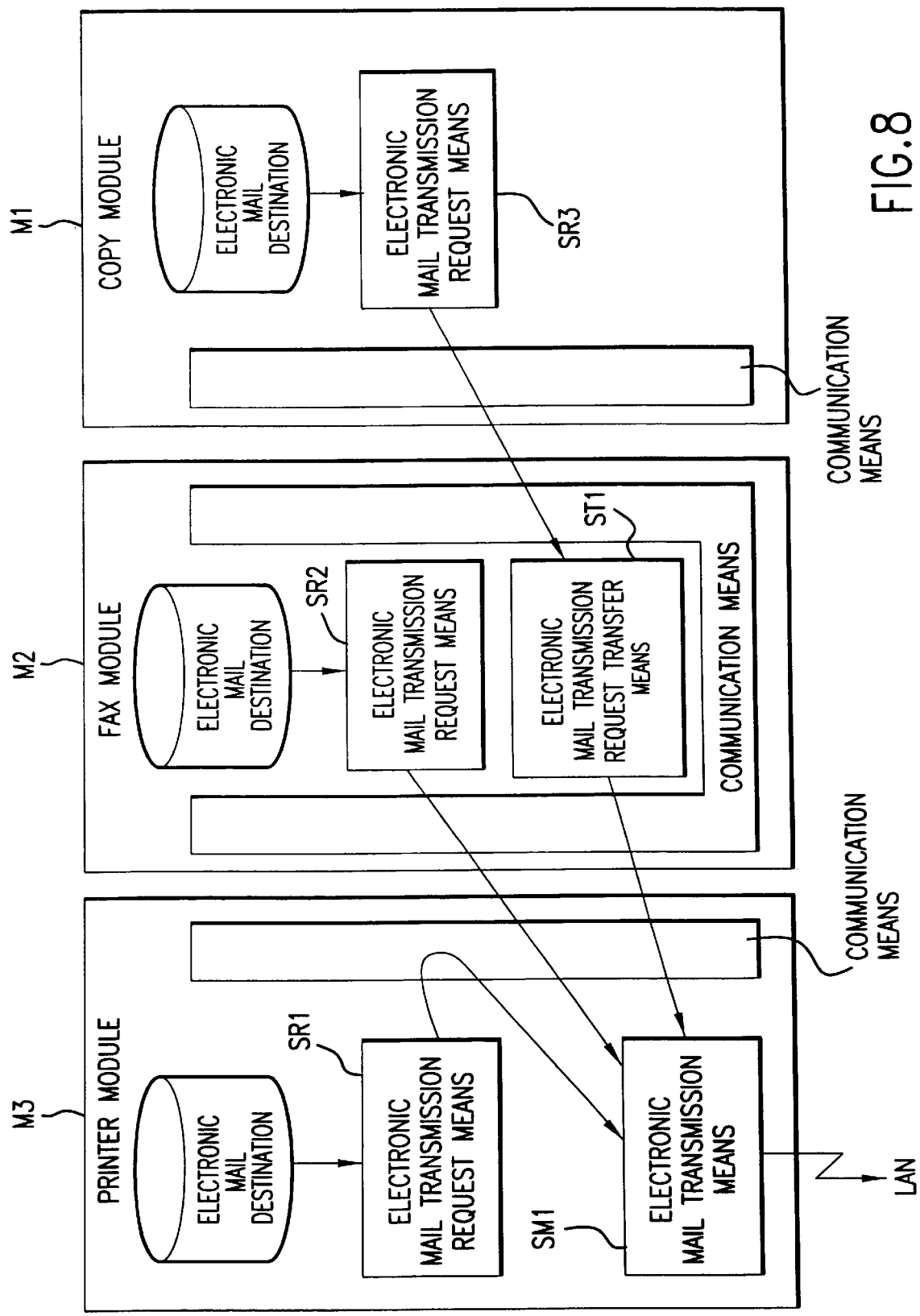
FIG. 8 is a software block diagram to show a third modified example of the first embodiment of the invention.

Alternatively, as shown in FIG. 8, an electronic mail destination may be stored in each of the electronic mail transmission request means SR3, SR2, and SR1 in the hardware modules of the copy module M1, the fax module M2, and the printer module M3 and the electronic mail transmission means SM1 may be requested to transmit electronic mail so as to transmit to the electronic mail destination stored in the electronic mail transmission request means SR3, SR2, or SR1. In this case, the electronic mail destination need not be contained in an electronic mail transmission request.

Alternatively, an electronic mail destination may be stored in the electronic mail transmission means SM1 and each of the electronic mail transmission request means SR3, SR2, and SR1 and if a destination is specified from the electronic mail transmission request means SR3, SR2, or SR1, the specified destination may be used; if no destination is specified from the electronic mail transmission request means SR3, SR2, or SR1, electronic mail may be transmitted to the destination stored in the electronic mail transmission means SM1.

(Second Embodiment)

Figure 9:
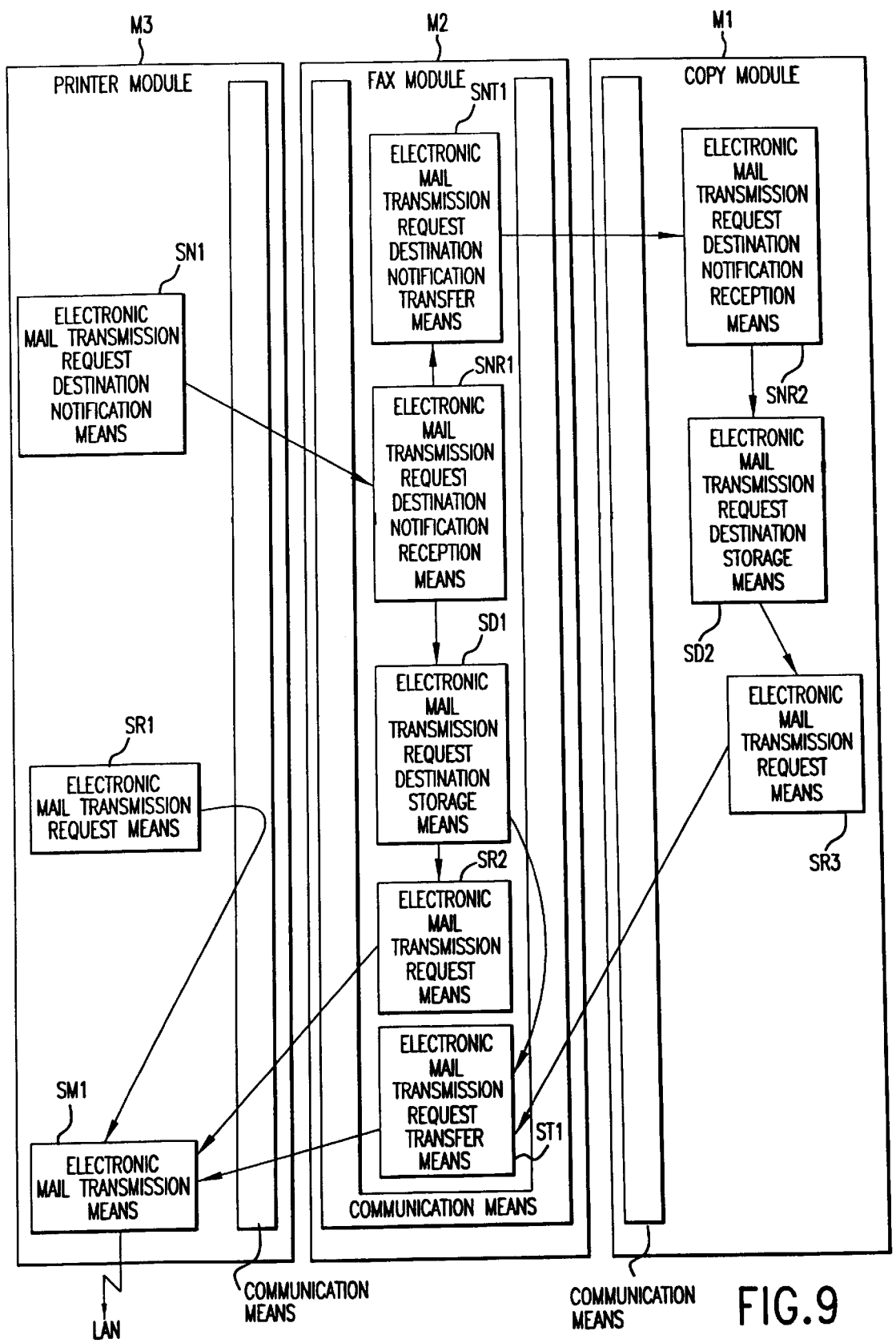
FIG. 9 is a software block diagram of an information processing system according to a second embodiment of the invention.

FIG. 9 is a software block diagram of an information processing system according to a second embodiment of the invention. That is, the software of the information processing system according to the second embodiment comprises electronic mail transmission request means SR3, electronic mail transmission request destination notification reception means SNR2, electronic mail transmission request destination storage means SD2, and communication means in a copy module M1, electronic mail transmission request means SR2, electronic mail transmission request transfer means ST1, electronic mail transmission request destination notification reception means SNR1, electronic mail transmission request destination storage means SD1, electronic mail transmission request destination notification transfer means SNT1, and communication means in a fax module M2, and electronic mail transmission request means SR1, electronic mail transmission means SM1, electronic mail transmission request destination notification means SN1, and communication means in a printer module M3.

The electronic mail transmission request means SR1, SR2, or SR3 transmits data of a part or all of electronic mail prepared in the module including the means SR1, SR2, or SR3 to the electronic mail transmission means SM1 contained in the printer module M3.

The electronic mail transmission request transfer means ST1 in the fax module M2 transfers an electronic mail transmission request transmitted from the electronic mail transmission request means SR3 in the copy module M1 to the electronic mail transmission means SM1 in the printer module M3.

The electronic mail transmission means SM1 in the printer module M3 receives electronic mail transmission requests sent from the electronic mail transmission request means SR1, SR2, and SR3 and transmits electronic mail to a LAN.

The electronic mail transmission request destination notification means SN1 in the printer module M3 sends the destination of an electronic mail transmission request, namely, the address of the electronic mail transmission means SM1 to the fax module M2 connected to the printer module M3.

The electronic mail transmission request destination notification reception means SNR1 in the fax module M2 receives the address sent from the electronic mail transmission request destination notification means SN1 in the printer module M3 and stores the received address in the electronic mail transmission request destination storage means SD1.

When the electronic mail transmission request destination notification reception means SNR1 receives the address of the electronic mail transmission means SM1, the electronic mail transmission request destination notification transfer means SNT1 in the fax module M2 transfers the address of the electronic mail transmission request transfer means ST1 to the copy module M1 adjacent to the fax module M2 so that the address of the electronic mail transmission request transfer means ST1 in the fax module M2 becomes the electronic mail transmission request destination.

The electronic mail transmission request destination notification reception means SNR2 in the copy module M1 receives the address transferred from the electronic mail transmission request destination notification transfer means SNT1 in the fax module M2 and stores the received address in the electronic mail transmission request destination storage means SD2.

That is, the address of the electronic mail transmission request destination in each hardware module is transferred in order according to the software configuration.

Figure 10:
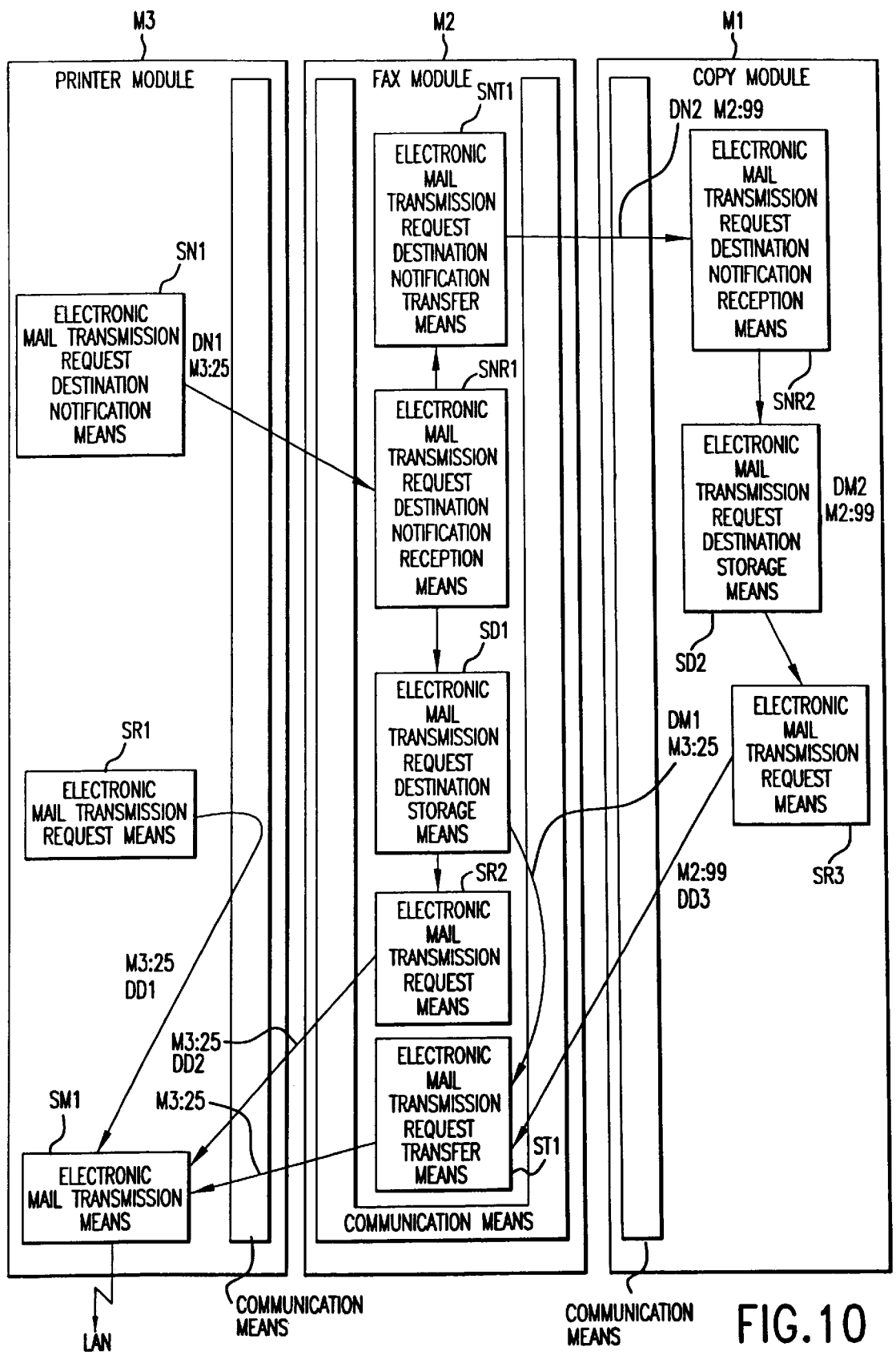
FIG. 10 is a conceptual drawing to show propagation of request destination information in the second embodiment of the invention.

FIG. 10 is a conceptual drawing to show information or destination of a message propagated in the software configuration of the information processing system according to the second embodiment. That is, if the fax module M2 is connected to the printer module M3, the address DN1 (M3:35) of the electronic mail transmission means SM1 is sent from the electronic mail transmission request destination notification means SN1 in the printer module M3 to the fax module M2.

The electronic mail transmission request destination notification reception means SNR1 in the fax module M2 receives the address DN1 and stores the address DN1 (M3:25) in the electronic mail transmission request destination storage means SD1.

If the copy module M1 is connected to the fax module M2, when the electronic mail transmission request destination notification reception means SNR1 in the fax module M2 receives the address DN1, an address DN2 is sent from the electronic mail transmission request destination notification transfer means SNT1 to the copy module M1.

To inform the copy module M1 that the address of the electronic mail transmission request transfer means ST1 in the fax module M2 is the electronic mail transmission request destination, the received address DN1 is converted into the address DN2 (M2:99) of the electronic mail transmission request transfer means ST1.

The copy module M1 receives the address DN2 at the electronic mail transmission request destination notification reception means SNR2 and stores the address DM2 (M2:99) in the electronic mail transmission request destination storage means SD2.

Next, to issue an electronic mail transmission request DD1, the electronic mail transmission request means SR1 in the printer module M3 sends the address (M3:25) of the electronic mail transmission means SM1.

To issue an electronic mail transmission request DD2, the electronic mail transmission request means SR2 in the fax module M2 reads the previously stored address (M3:25) from the electronic mail transmission request destination storage means SD1 and sends the electronic mail transmission request DD2 to the address (M3:25), whereby the transmission request DD2 is transmitted to the electronic mail transmission means SM1 in the printer module M3 corresponding to the address (M3:25).

To issue an electronic mail transmission request DD3, the electronic mail transmission request means SR3 in the copy module M1 reads the previously stored address (M2:99) from the electronic mail transmission request destination storage means SD2 and sends the electronic mail transmission request DD3 to the address (M2:99), whereby the transmission request DD3 is sent to the electronic mail transmission request transfer means ST1 in the fax module M2 corresponding to the address (M2:99).

Further, the electronic mail transmission request transfer means ST1, to which the transmission request DD3 is sent, reads the address (M3:25) stored in the electronic mail transmission request destination storage means SD1 and transfers the electronic mail transmission request DD3 to the address (M3:25), whereby the transmission request DD3 sent from the copy module M3 is transferred by the electronic mail transmission request transfer means ST1 to the electronic mail transmission means SM1 in the printer module M3 corresponding to the address (M3:25).

Figure 11:
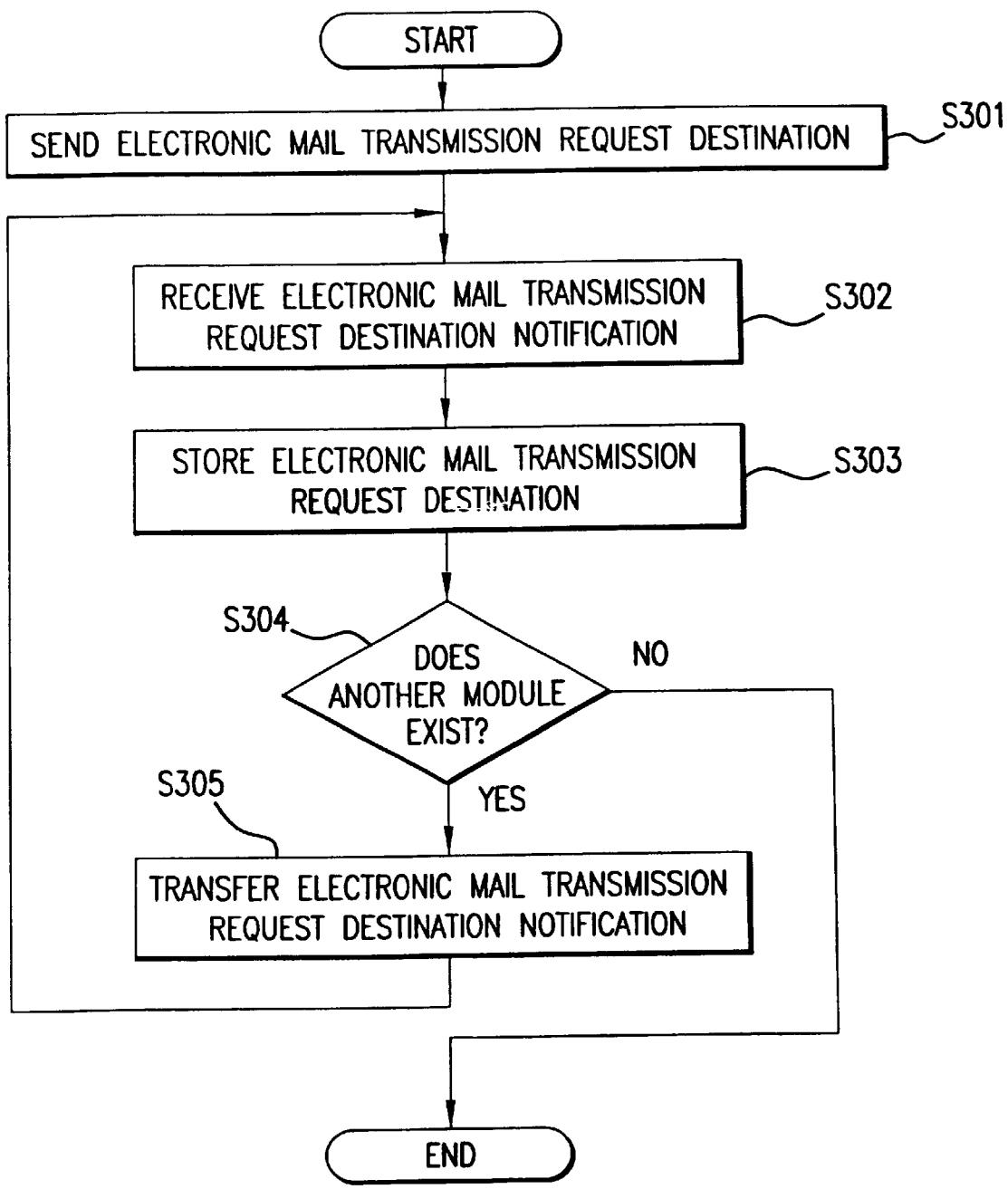
FIG. 11 is an operation flowchart in the second embodiment of the invention (No. 1)

FIG. 11 is a flowchart of processing of propagating an address to which an electronic mail transmission request is to be transmitted in the information processing system according to the second embodiment. The processing will be discussed with reference to the flowchart of FIG. 11. In the description to follow, the reference numerals not shown in FIG. 11 are based on those previously described with reference to FIG. 10.

First, the electronic mail transmission request destination notification means SN1 sends the address at which an electronic mail transmission request is accepted to the adjacent hardware module at step S301. That is, the address DN1 of the electronic mail transmission means SM1 in the printer module M3 is sent.

Next, the electronic mail transmission request destination notification reception means SNR1 receives the address DN1 at step S302 and stores the address in the electronic mail transmission request destination storage means SD1 at step S303. Further, it checks whether or not a module other than the address sending module exists at step S304. In this case, the copy module M1 exists (YES at step S304), then the electronic mail transmission request destination notification transfer means SNT1 sends the address at which an electronic mail transmission request is accepted.

At this time, the address to be sent is replaced with the address DN2 of the electronic mail transmission request transfer means ST1 in the fax module M2 and the address DN2 is sent. Steps S302 and S303 are also executed in the copy module M1 in a similar manner.

Figure 12:
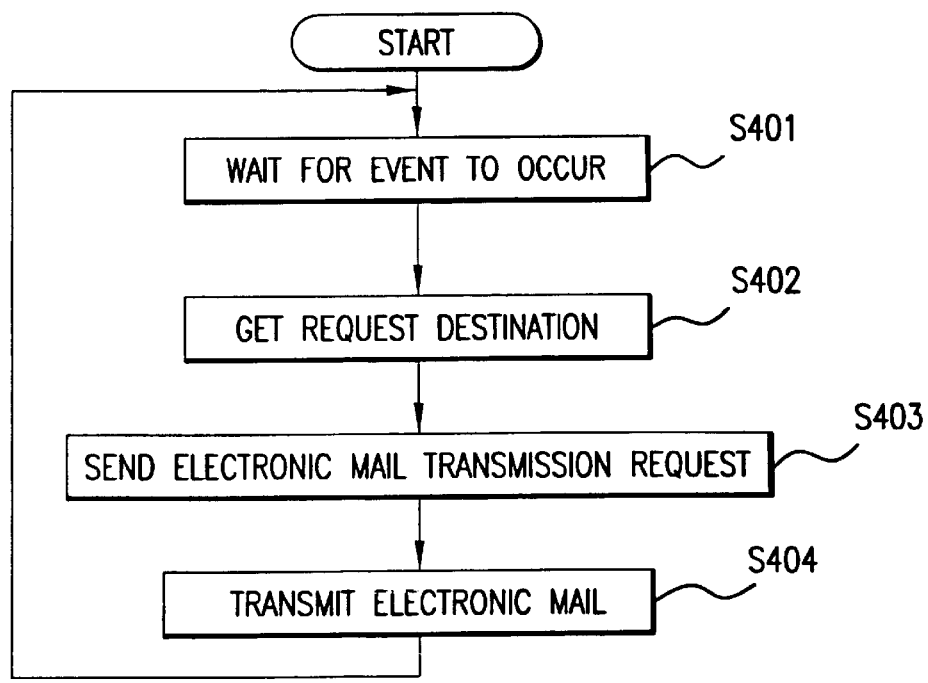
FIG. 12 is an operation flowchart in the second embodiment of the invention (No. 2)

FIG. 12 is an operation flowchart for transmitting electronic mail from the fax module in the information processing system according to the second embodiment. In the description to follow, the reference numerals not shown in FIG. 12 are based on those previously described with reference to FIG. 10.

First, the electronic mail transmission request means or SR2 waits for an event to occur as a trigger for transmitting electronic mail such as fault occurrence at step S401. Next, it gets the address DM1 stored in the electronic mail transmission request destination storage means SD1 at step S402.

Next, when an event as a trigger for transmitting electronic mail such as fault occurrence occurs, at step S403 the electronic mail transmission request means SR2 transmits an electronic mail transmission request to the address previously gotten at step S402. The electronic mail transmission means SM1 corresponding to the address receives the electronic mail transmission request and transmits electronic mail to the LAN at step S404.

Figure 13:
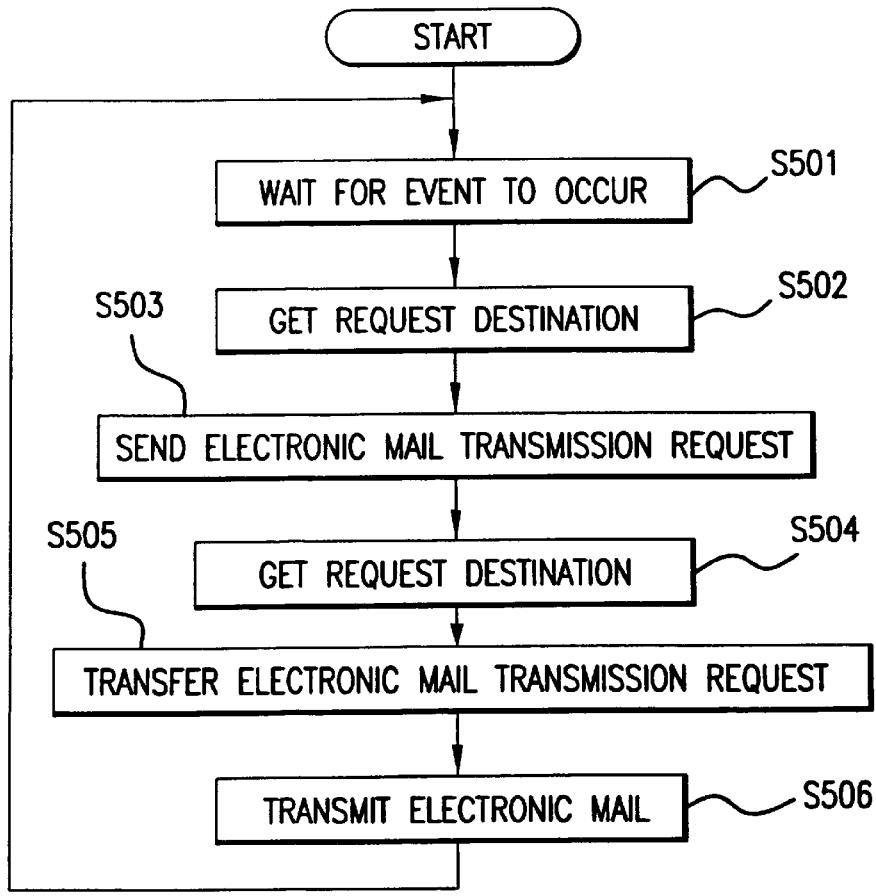
FIG. 13 is an operation flowchart in the second embodiment of the invention (No. 3)

FIG. 13 is an operation flowchart for transmitting electronic mail from the copy module in the information processing system according to the second embodiment. In the description to follow, the reference numerals not shown in FIG. 13 are based on those previously described with reference to FIG. 10.

First, the electronic mail transmission request means or SR3 waits for an event to occur as a trigger for transmitting electronic mail such as fault occurrence at step S501. Next, it gets the address DM2 stored in the electronic mail transmission request destination storage means SD2 at step S502.

Next, when an event as a trigger for transmitting electronic mail such as fault occurrence occurs, at step S503 the electronic mail transmission request means SR3 transmits an electronic mail transmission request to the address previously gotten at step S502, whereby the electronic mail transmission request is transmitted to the address of the electronic mail transmission request transfer means ST1 previously gotten at step S502.

Next, the electronic mail transmission request transfer means ST1 gets the address DM1 stored in the electronic mail transmission request destination storage means SD1 at step S504. Next, at step S505, it transfers the electronic mail transmission request to the address of the electronic mail transmission means SM1 gotten at step S504.

The electronic mail transmission means SM1 receives the electronic mail transmission request and transmits electronic mail to the LAN at step S506.

(Third Embodiment)

Figure 14:
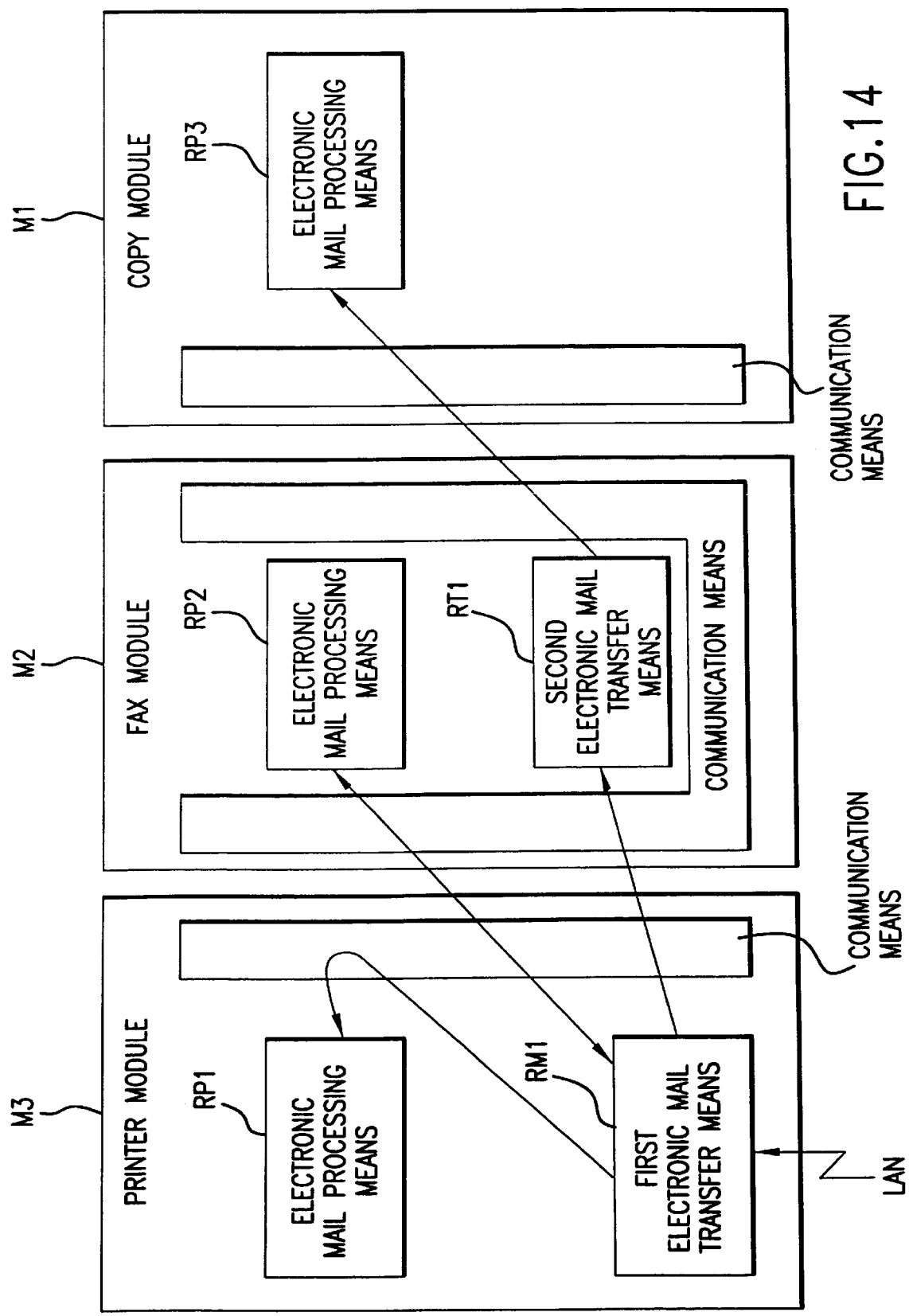
FIG. 14 is a software block diagram of an information processing system according to a third embodiment of the invention.

Next, a third embodiment of the invention will be discussed. FIG. 14 is a software block diagram of an information processing system according to the third embodiment. In the information processing system according to the third embodiment, software or a software patch transmitted through a network such as a LAN is received as an attached file to electronic mail and is transferred to the destination hardware module for processing.

That is, the information processing system comprises a copy module M1 provided with electronic mail processing means RP3 and communication means, a fax module M2 provided with electronic mail processing means RP2, second electronic mail transfer means RT1, and communication means, and a printer module M3 provided with electronic mail processing means RP1, first electronic mail transfer means RM1, and communication means.

The electronic mail processing means RP1, RP2, or RP3 executes processing indicated in electronic mail sent to the hardware module including the processing means RP1, RP2, or RP3 or predetermined processing.

The first electronic mail transfer means RM1 provided in the printer module M3 transfers electronic mail sent through the LAN to the corresponding hardware module.

The second electronic mail transfer means RT1 provided in the fax module M2 transfers electronic mail sent from the first electronic mail transfer means RM1 provided in the printer module M3 connected to the LAN to the copy module M1.

Figure 15:
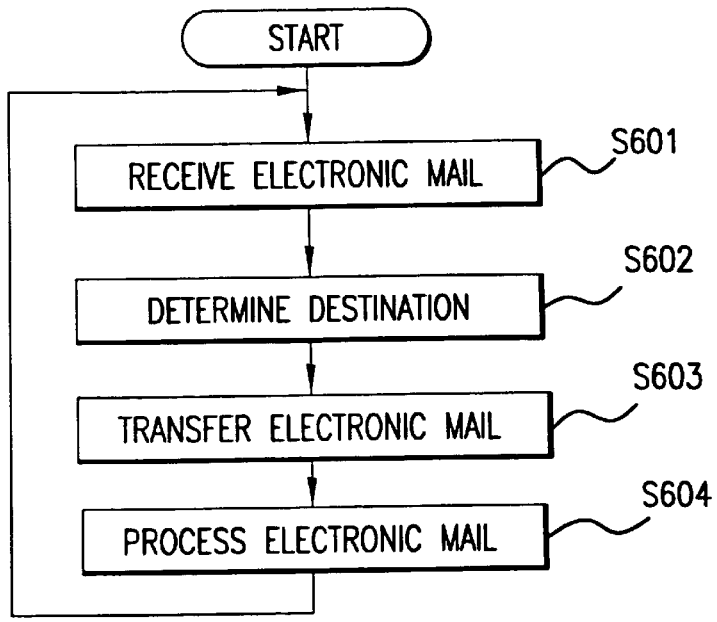
FIG. 15 is an operation flowchart in the third embodiment of the invention (No. 1)

FIG. 15 is an operation flowchart for processing electronic mail received at the printer module or the fax module in the information processing system according to the third embodiment. The operation will be discussed with reference to the flowchart. In the description to follow, the reference numerals not shown in FIG. 15 are based on those previously described with reference to FIG. 14.

First, the first electronic mail transfer means RM1 receives electronic mail from the LAN at step S601. Next, it determines the electronic mail processing means (destination of the received electronic mail) for processing the electronic mail at step S602.

Next, the first electronic mail transfer means RM1 transfers the received electronic mail to the electronic mail processing means for processing the electronic mail at step S603. The electronic mail processing means RP1 or RP2 processes the transferred electronic mail at step S604.

The processing means rewrite of the program written into ROM (flash ROM) or the like. Alternatively, operation information of the information processing system may be collected and electronic mail may be transmitted according to the procedure shown in the first embodiment.

To determine the electronic mail processing means as the destination of electronic mail, various pieces of quotation information can be used. For example, comment information added to a destination field of electronic mail can be used. Proper rules may be defined for data in the main body to determine the electronic mail processing means.

The electronic mail processing means RP1, RP2, and RP3 may judge the contents of input electronic mail and determine processing to be executed. Further, one hardware module may be provided with one or more electronic mail processing means so that each electronic mail processing means performs predetermined processing.

Figure 16:
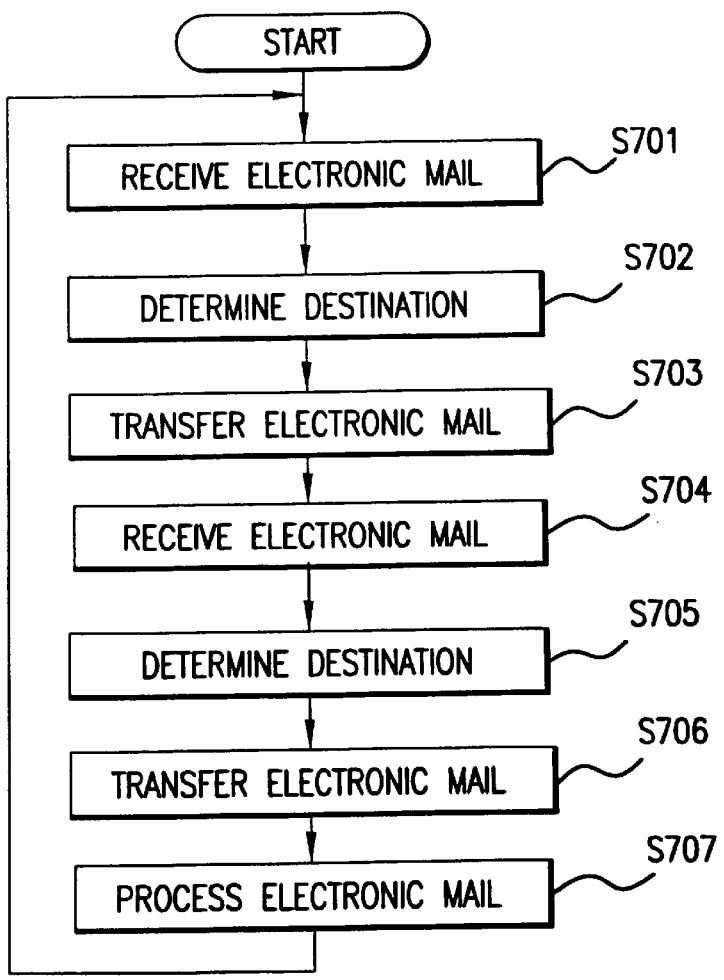
FIG. 16 is an operation flowchart in the third embodiment of the invention (No. 2)

FIG. 16 is an operation flowchart for processing electronic mail received at the copy module in the information processing system according to the third embodiment. The operation will be discussed with reference to the flowchart.

In the description to follow, the reference numerals not shown in FIG. 16 are based on those previously described with reference to FIG. 14.

First, the first electronic mail transfer means RM1 receives electronic mail from the LAN at step S701. Next, it determines the electronic mail processing means (destination of the received electronic mail) for processing the electronic mail at step S702.

Next, the first electronic mail transfer means RM1 transfers the received electronic mail to the electronic mail processing means for processing the electronic mail at step S703. Further, the second electronic mail transfer means RT1 receives the transferred electronic mail at step S704.

Next, the second electronic mail transfer means RT1 determines the electronic mail processing means (destination of the electronic mail) for processing the electronic mail at step S705. Next, it transfers the received electronic mail to the electronic mail processing means for processing the electronic mail at step S706. The electronic mail processing means RP3 processes the transferred electronic mail at step S707.

Figure 17:
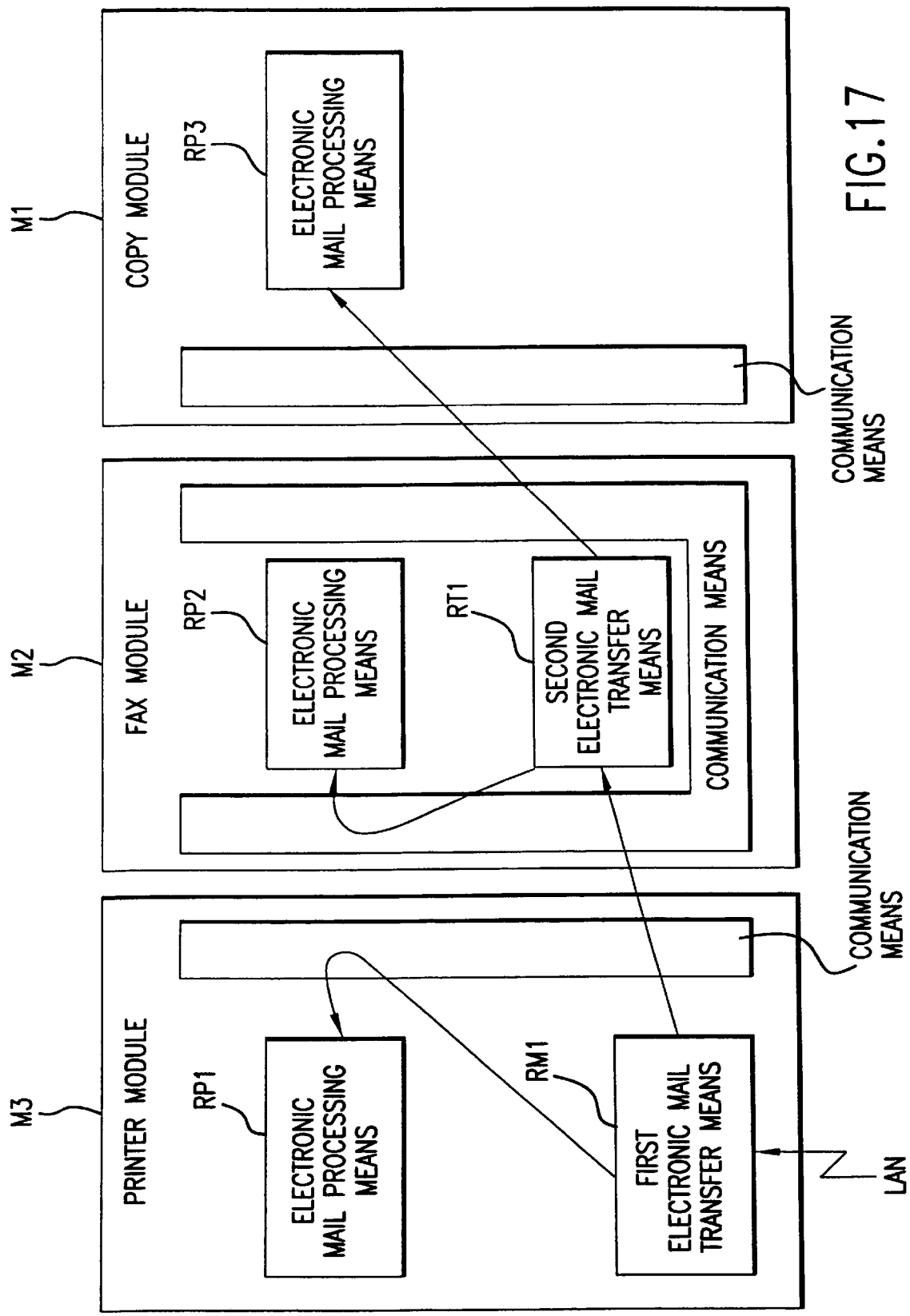
FIG. 17 is a software block diagram to show a first modified example of the third embodiment of the invention.

As shown in FIG. 17, electronic mail may be transferred to the electronic mail processing means RP2 in the fax module M2 via the second electronic mail transfer means RT1, whereby if transfer of electronic mail is required, the first electronic mail transfer means RM1 in the printer module M3 may always send electronic mail to the second electronic mail transfer means RT1 regardless of whether the electronic mail is transferred to the fax module M2 or the copy module M1.

In the embodiment, the adjacent hardware modules are connected in a tandem way, but the hardware modules may have a large number of contacts.

Figure 18:
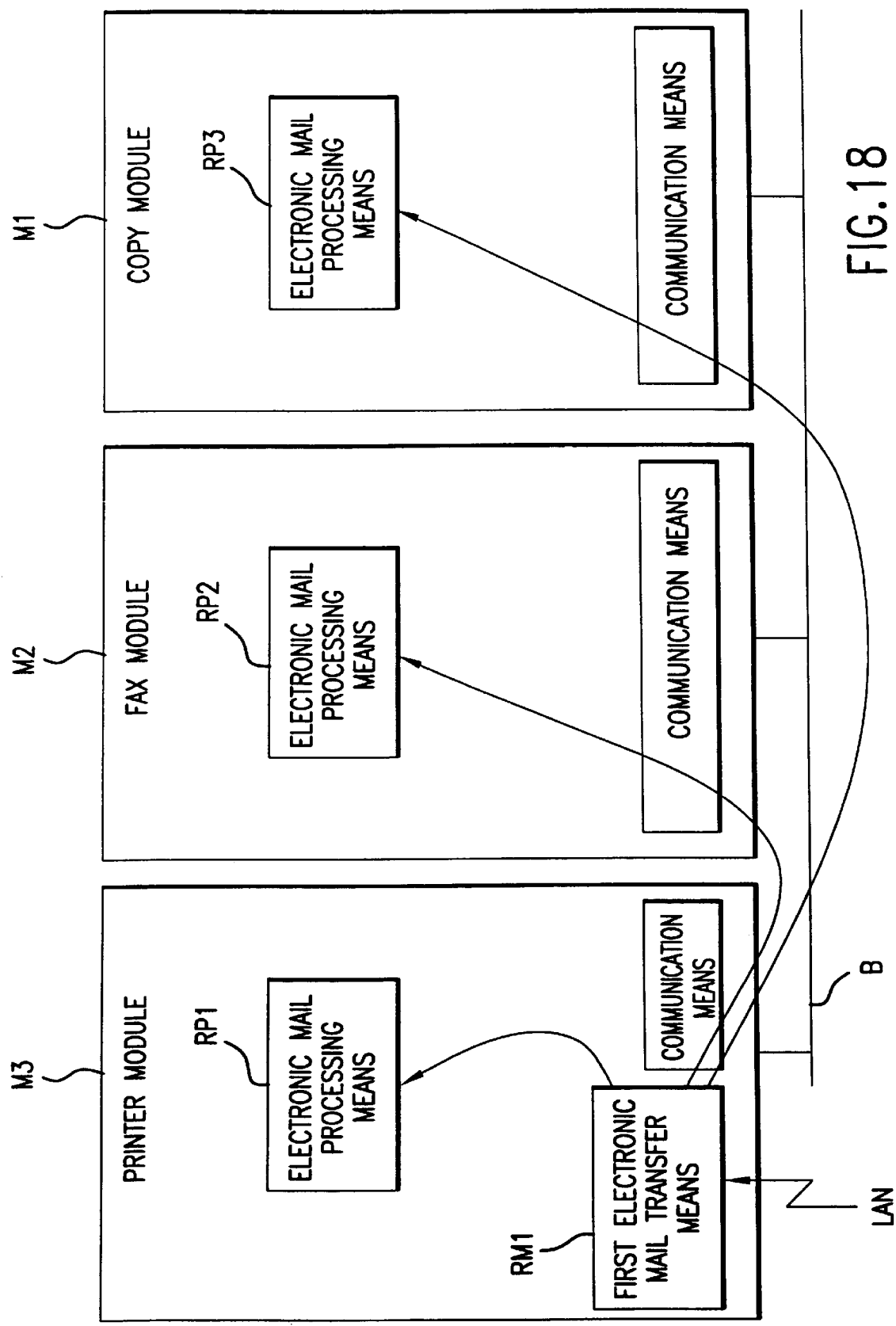
FIG. 18 is a software block diagram to show a second modified example of the third embodiment of the invention.

As shown in FIG. 18, the hardware modules maybe connected by a bus B. In this case, the intermediate hardware module (in this case, the fax module M2) does not require the second electronic mail transfer means RT1 for transferring electronic mail. That is, the hardware modules can receive electronic mail on the bus B and it is made possible to eliminate the load on the intermediate hardware module in electronic mail transfer.

(Fourth Embodiment)

Figure 19:
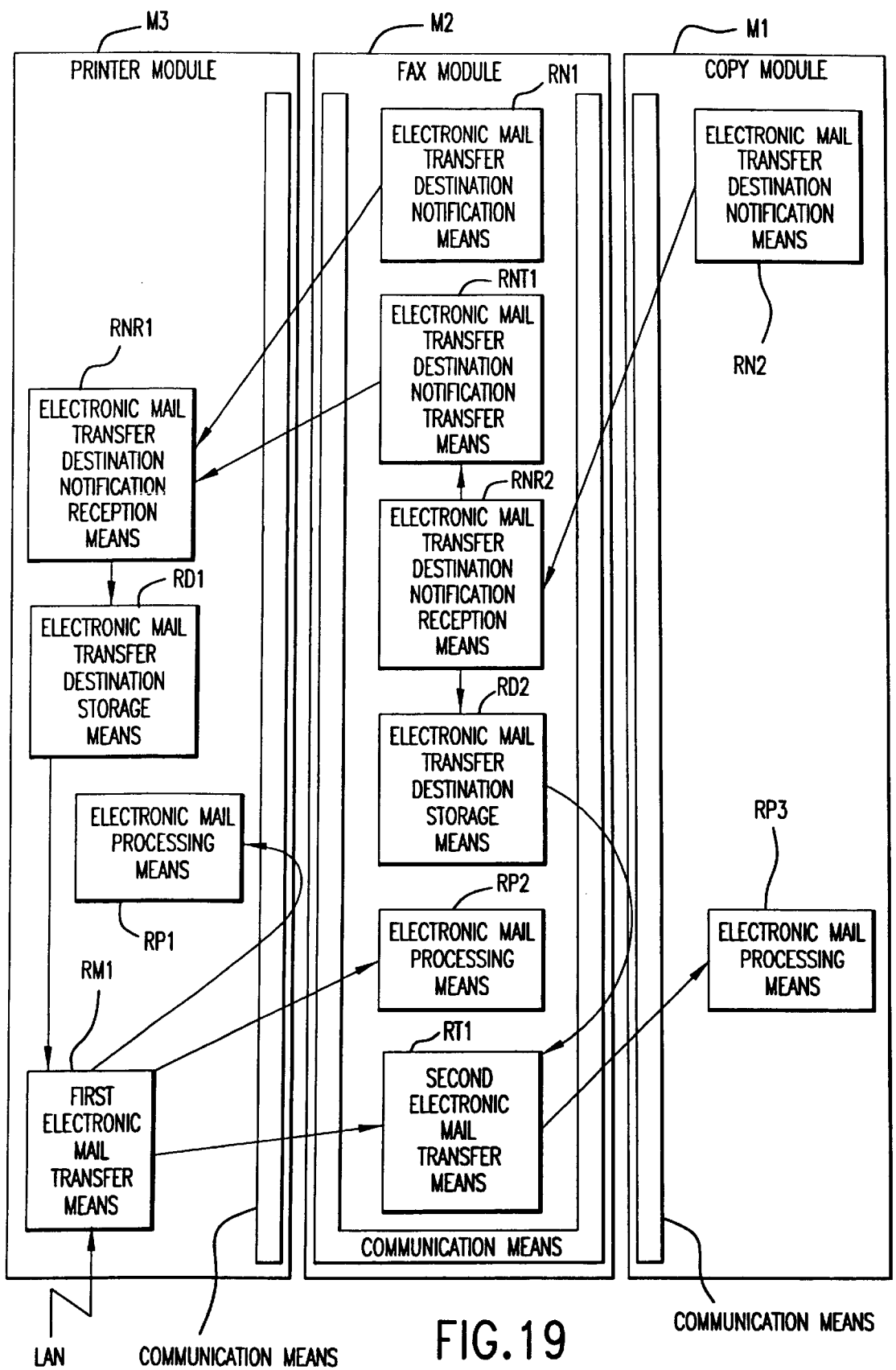
FIG. 19 is a software block diagram of an information processing system according to a fourth embodiment of the invention.

FIG. 19 is a software block diagram of an information processing system according to a fourth embodiment of the invention. That is, the software of the information processing system according to the fourth embodiment comprises electronic mail processing means RP3, electronic mail transfer destination notification means RN2, and communication means in a copy module M1, electronic mail processing means RP2, second electronic mail transfer means RT1, electronic mail transfer destination notification means RN1, electronic mail transfer destination notification reception means RNR2, electronic mail transfer destination storage means RD2, electronic mail transfer destination notification transfer means RNT1, and communication means in a fax module M2, and electronic mail processing means RP1, first electronic mail transfer means RM1, electronic mail transfer destination notification reception means RNR1, electronic mail transfer destination storage means RD1, and communication means in a printer module M3.

The electronic mail processing means SR1, SR2, or SR3 executes processing indicated in electronic mail sent to the hardware module including the processing means SR1, SR2, or SR3 or predetermined processing.

The electronic mail transfer destination notification means RN2 provided in the copy module M1 sends the destination of electronic mail, namely, the address of the electronic mail processing means RP3 and quotation information for quoting the destination to the fax module M2 adjacent to the copy module M1.

The second electronic mail transfer means RT1 provided in the fax module M2 receives electronic mail to the copy module M1 sent from the printer module M3 connected to the LAN and transfers the received electronic mail to the copy module M1.

The electronic mail transfer destination notification reception means RNR2 receives the address, etc., of the electronic mail processing means RP3 sent from the electronic mail transfer destination notification means RN2 in the copy module M1 and stores the received address, etc., in the electronic mail transfer destination storage means RD2.

The electronic mail transfer destination notification transfer means RNT1 sends the destination of the electronic mail to be transferred, transmitted by the printer module M3, namely, the address of the second electronic mail transfer means RT1 to the printer module M3.

The electronic mail transfer destination notification means RN1 sends the destination of the electronic mail to the fax module M2 transmitted by the printer module M3, namely, the address of the electronic mail processing means RP2 to the printer module M3.

The first electronic mail transfer means RM1 provided in the printer module M3 transfers electronic mail sent from the LAN to the corresponding hardware module.

The electronic mail transfer destination notification reception means RNR1 receives the address sent from the electronic mail transfer destination notification means RN1 in the fax module M2 and the address sent from the electronic mail transfer destination notification transfer means RNT1, and stores the received addresses in the electronic mail transfer destination storage means RD1.

Figure 20:
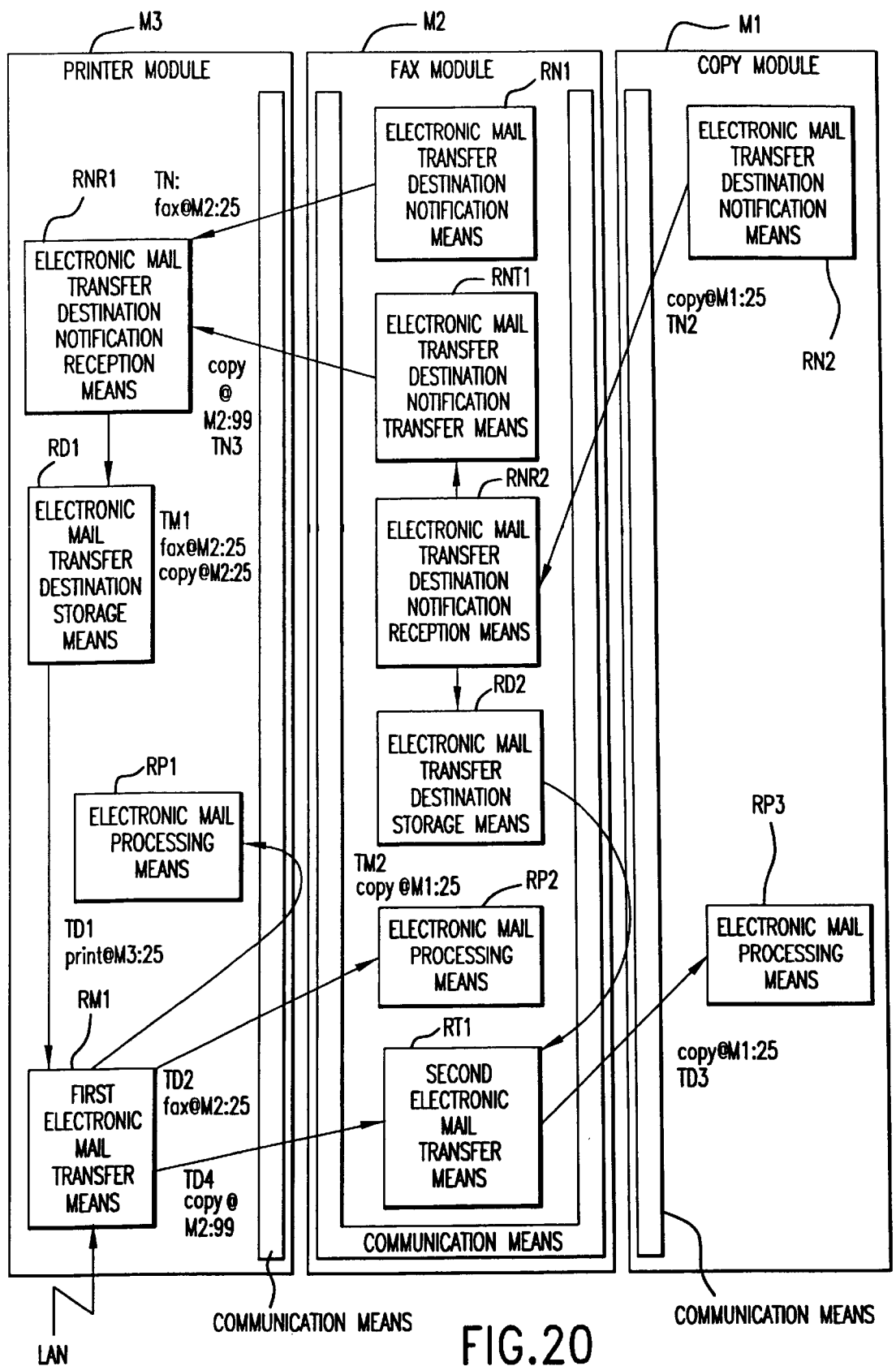
FIG. 20 is a conceptual drawing to show propagation of request destination information in the fourth embodiment of the invention.

FIG. 20 is a conceptual drawing to show information or destination of a message propagated in the software configuration of the information processing system according to the fourth embodiment. That is, when the fax module M2 is connected to the printer module M3, the address TN1 (fax@M2:25) of the electronic mail processing means RP2 is sent from the electronic mail transfer destination notification means RN1 in the fax module M2 to the printer module M3.

If the copy module M1 is connected to the fax module M2, the address TN2 (copy@M1:25) of the electronic mail processing means RP3 is sent from the electronic mail transfer destination notification means RN2 in the copy module M1 to the fax module M2.

The electronic mail transfer destination notification reception means RNR2 in the fax module M2 receives the address TN2 sent from the copy module M1, stores the address in the electronic mail transfer destination storage means RD2, and sends the address to the electronic mail transfer destination notification transfer means RNT1, which then converts the address into the address TN3 (copy@M2:99) of the second electronic mail transfer means RT1 and sends the address TN3 (copy@M2:99) to the printer module M3.

The printer module M3 receives the address TN1, TN3 sent from the fax module M2 at the electronic mail transfer destination notification reception means RNR1 and stores the address in the electronic mail transfer destination storage means RD1.

If electronic mail to the printer module M3 is received at the first electronic mail transfer means RM1 in the printer module M3, it is transmitted to the address TD1 (print@M3:25) of the electronic mail processing means RP1.

If electronic mail received at the first electronic mail transfer means RM1 is addressed to the fax module M2, the address of the fax module M2 stored in the electronic mail transfer destination storage means RD1 is read and the electronic mail is transmitted to the address TD2 (fax@M2:25).

If electronic mail received at the first electronic mail transfer means RM1 is addressed to the copy module M1, the address of the second electronic mail transfer means RT1 stored in the electronic mail transfer destination storage means RD1 is read and the electronic mail is transmitted to the address TD4 (copy@M2:99).

If electronic mail is sent from the first electronic mail transfer means RM1, the second electronic mail transfer means RT1 reads the address of the copy module M1 stored in the electronic mail transfer destination storage means RD2 and transfers the electronic mail to the address TD3 (copy@M1:25), whereby the electronic mail is sent from the printer module M3 through the fax module M2 to the copy module M1.

Figure 21:
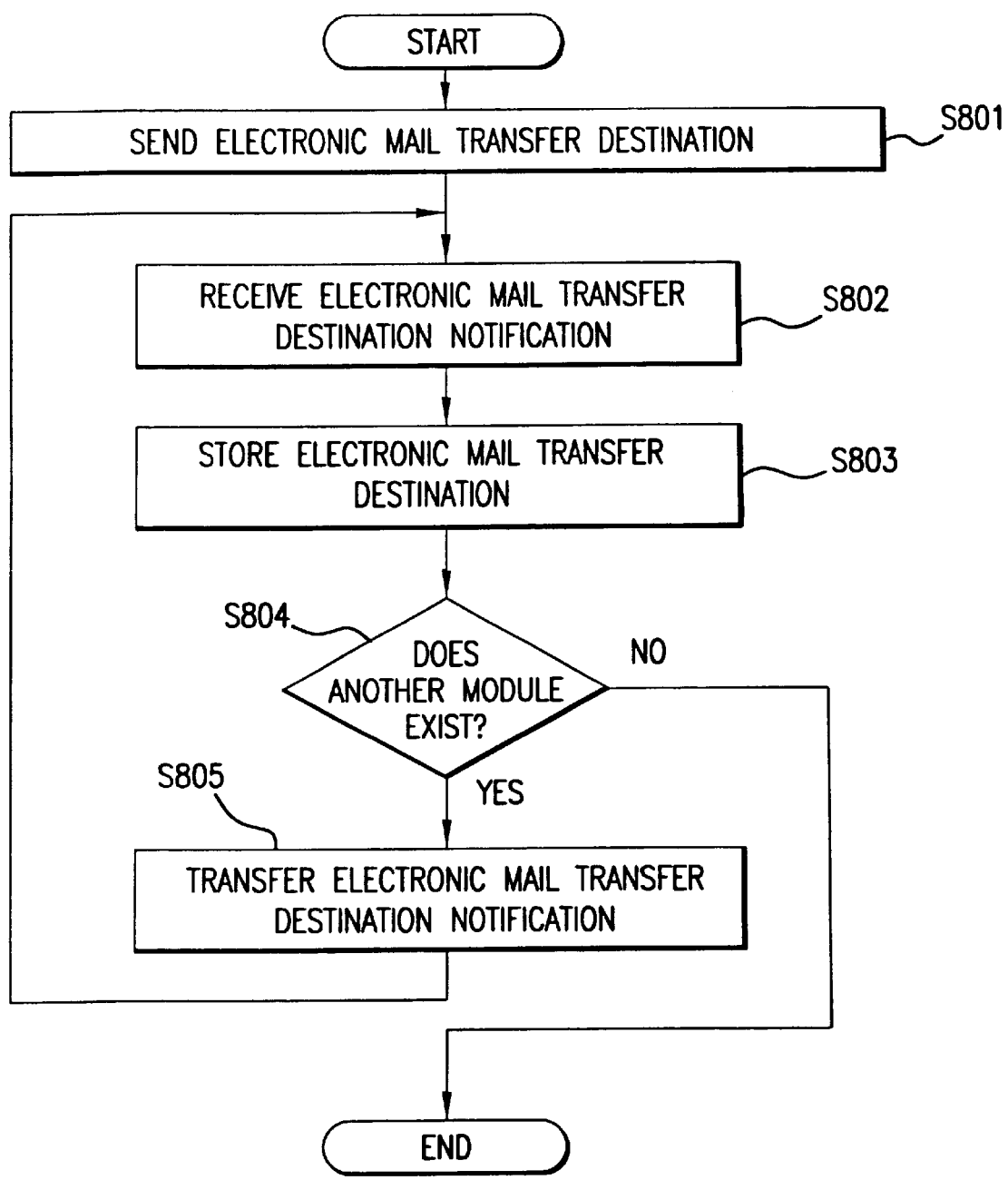
FIG. 21 is an operation flowchart in the fourth embodiment of the invention.
Figure 22:
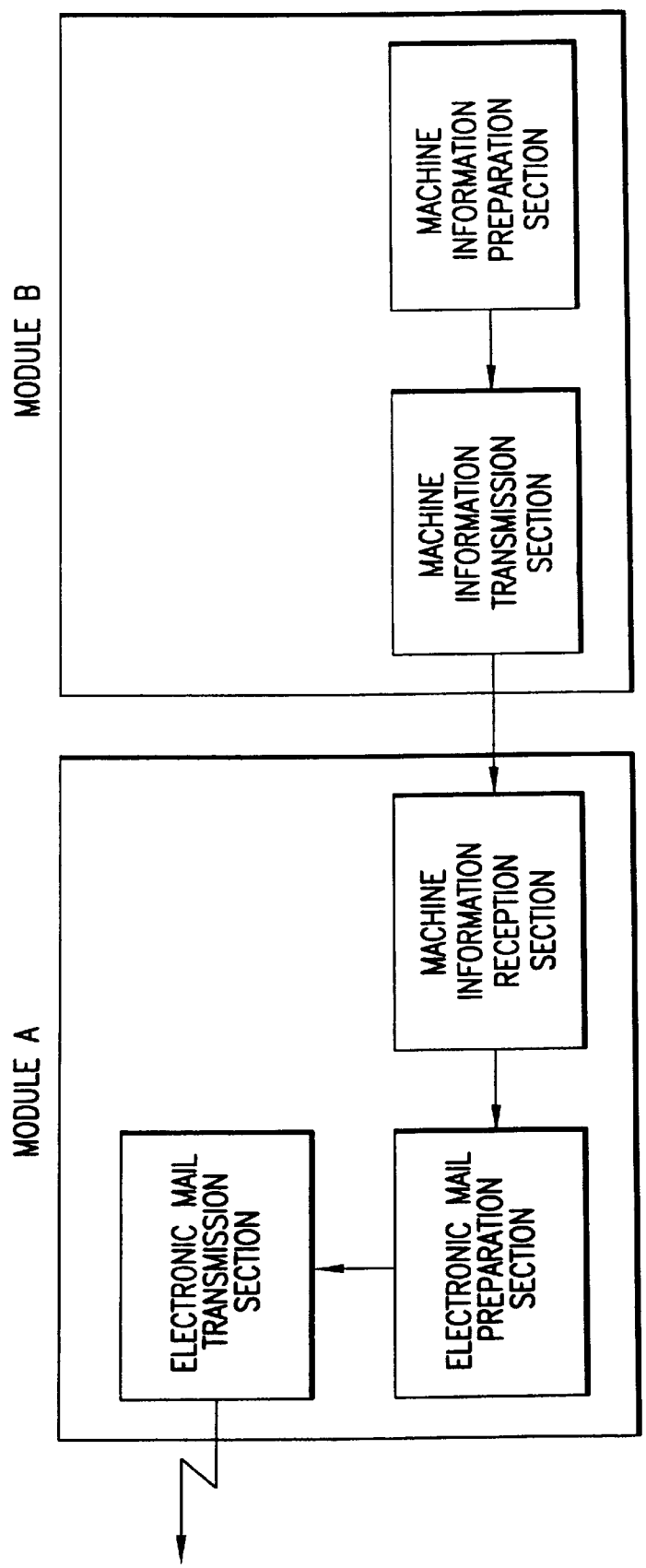
FIG. 22 is a block diagram to show a related art for transmitting electronic mail.
Figure 23:
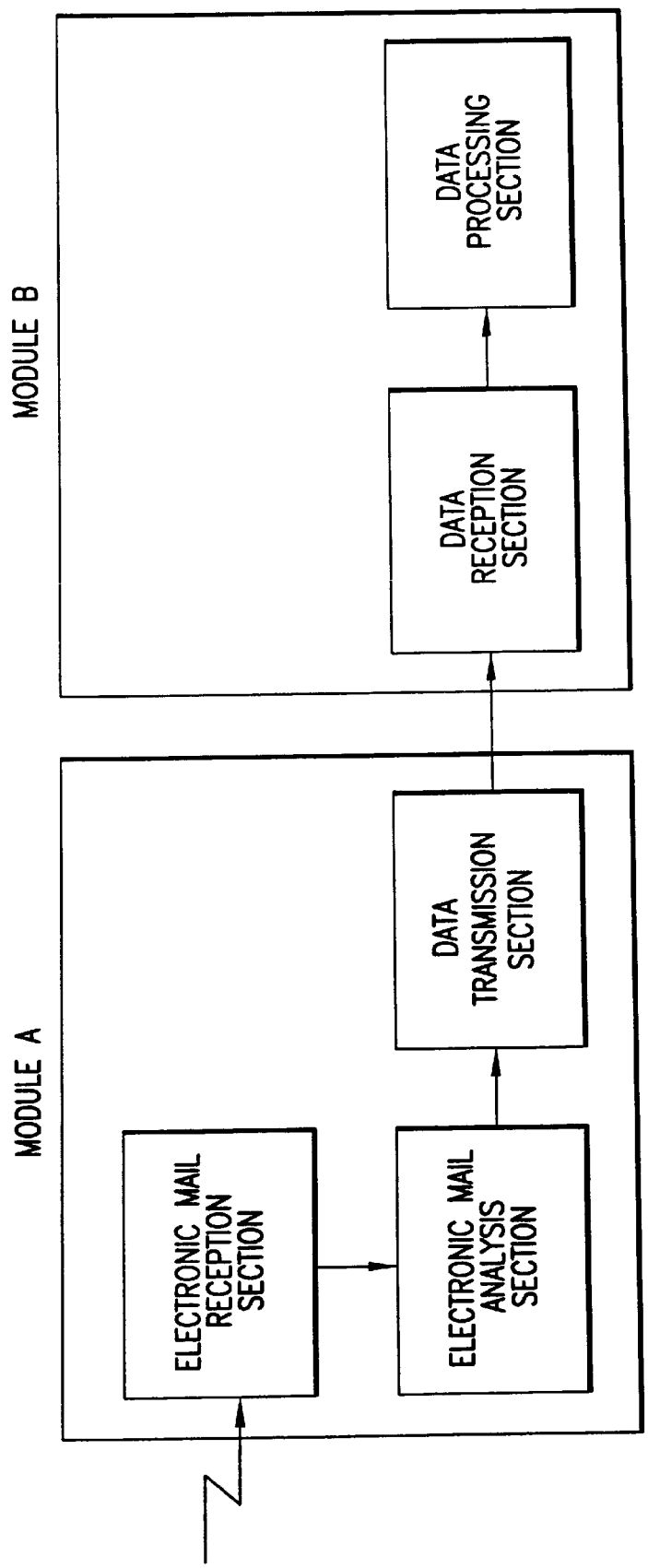
FIG. 23 is a block diagram to show a related art for receiving electronic mail.

FIG. 21 is a flowchart of processing of propagating an address to which received electronic mail is to be transferred in the information processing system according to the fourth embodiment. The processing will be discussed with reference to the flowchart. In the description to follow, the reference numerals not shown in FIG. 21 are based on those previously described with reference to FIG. 20.

First, the electronic mail transfer destination notification means RN1 in the fax module M2 sends the address of the electronic mail processing means RP2 in the fax module M2 and information for quoting the address to the printer module M3 at step S801. Taking the address TN1 as an example, the address of the electronic mail processing means RP2 in the fax module M2 is "M2:25" and the character string as a key for quoting the address is "fax."

Next, the electronic mail transfer destination notification reception means RNR1 receives the address TN1 at step S802 and stores the address in the electronic mail transfer destination storage means RD1 at step S803. Here, a hardware module other than the address and information sending module does not exist (NO at step S804), thus the address and information are not transferred any more.

At step S801, the electronic mail transfer destination notification means RN1 may send the address and information to all adjacent hardware modules. In this case, sending the address and information to the copy module M1 results in a transmission error or is ignored in the copy module M1. Likewise, the electronic mail transfer destination notification means RN2 in the copy module M1 sends the address of the electronic mail processing means RP3 in the copy module M1 and information for quoting the address to the fax module M2 at step S801.

Taking the address TN2 as an example, the address of the electronic mail processing means RP3 in the copy module M1 is "M1:25" and the character string as a key for quoting the address is "copy."

Next, the electronic mail transfer destination notification reception means RNR2 receives the address TN2 at step S802 and stores the address in the electronic mail transfer destination storage means RD2 at step S803. Here, a hardware module other than the address and quotation information sending module, namely, the printer module exists (YES at step S804), thus the address and quotation information are further transferred by the electronic mail transfer destination notification transfer means RNT1 at step S805.

At this time, the transferred address is replaced with the address of the second electronic mail transfer means RT1. That is, "M1:25" of the address TN2 is replaced with "M2:99" of the address TN3.

After this, the transferred address and quotation information are received at the electronic mail transfer destination notification reception means RNR1 and is stored in the electronic mail transfer destination storage means RD1.

In the embodiment, the procedure of transferring received electronic mail by the printer module M3 is similar to that previously described with reference to the flowcharts of FIGS. 15 and 16 in the third embodiment. When the first electronic mail transfer means RM1 and the second electronic mail transfer means RT1 determine the destination at steps S602 and S705, reference made to the information stored in the electronic mail transfer destination storage means RD1 and RD2 is added. For example, if the comment information of the destination of electronic mail is a character string of "fax," the electronic mail is transferred to the address corresponding to the character string.

As described above, the invention provides the following advantage: In the information processing system made up of a plurality of hardware modules for transmitting machine information by electronic mail, it is made possible to develop a hardware module having a network interface without designing the contents or format of machine information gotten from a hardware module having no network interface.

It is made possible to extend the function of a hardware module having no network interface without extending the function of a hardware module having a network interface.

It is made possible to develop a hardware module having a network interface without designing the contents or format of data supplied to a hardware module having no network interface.

It is made possible to extend the function of a hardware module having no network interface without extending the function of a hardware module having a network interface.

What is claimed is:

1. An information processing apparatus capable of executing a plurality of functions by having a plurality of modules and connected to an external system via a network, comprising:

a first module; and a second module connected to the external system and with said first module, wherein said first module comprises:

preparation means for preparing machine information of said first module to be transmitted to the external system in a format in which the external system recognizes the machine information, and first transmission means for transmitting to said second module the machine information of said first module prepared by said preparation means and a transfer request for transferring the machine information of said first module to the external system to said second module; and said second module comprises:

first transfer means for transferring the machine information of said first module transmitted by said first transmission means to the external system via the network in accordance with the transfer request, wherein the machine information pertains to a fault information of a fault occurring in the first module.

2. The information processing apparatus as claimed in claim 1, wherein:

said second module further comprises:

second transmission means for transmitting address information indicating an address of said first transfer means to said first module;

said first module further comprises:
first reception means for receiving the address information transmitted by said second transmission means, and
first storage means for storing the address information received by said first reception means; and
said first transmission means transmits the machine information of said first module and the transfer request to the external system to the address indicated by the address information stored in said first storage means.

3. The information processing apparatus as claimed in claim 1, wherein:
said first module further comprises:
second reception means for receiving information and a request for transferring the information to the external system from a different module connected to the first module; and
second transfer means for transferring the information and the request for transferring the information to the external system received by said second reception means to said second module.

4. The information processing apparatus as claimed in claim 3, wherein
said first module further comprises:
second transmission means for transmitting address information indicating an address of said second transfer means to the different module.

5. The information processing apparatus as claimed in claim 1, wherein:
said second module further comprises second storage means for storing address information indicating an address of the external system, and
said first transfer means transfers the machine information of the first module to the address indicated by the address information stored in said second storage means.

6. The information processing apparatus as claimed in claim 1, wherein:
said first module further comprises third storage means for storing address information indicating an address of the external system, and
said first transfer means transfers the machine information to the address indicated by the address information stored in said third storage means.

7. An information processing apparatus capable of executing a plurality of functions by having a plurality of modules and connected to an external system via a network, comprising:
a first module; and
a second module connected to the external system and with said first module, wherein
said second module comprises:
reception means for receiving processing information and a transfer request for transferring the processing information to a destination module via the network, and
transfer means for transferring the processing information received by said reception means to said first module in accordance with the transfer request; and
said first module comprises:
processing means for performing processing based on the processing information transferred by said transfer means, wherein the processing information pertains to a software or a software patch to be processed in the first module.

8. The information processing apparatus as claimed in claim 7, wherein
said first module further comprises:
transmission means for transmitting address information indicating an address of said processing means to said second module, and
said second module further comprises:
second reception means for receiving the address information transmitted by said transmission means; and
storage means for storing the address information received by said second reception means, and wherein
said transfer means transfers the processing information to the address indicated by the address information stored in said storage means.

9. The information processing apparatus as claimed in claim 8, wherein:
said first module further comprises:
third reception means for receiving address information indicating an address of processing means contained in a different module, and
replacement means for replacing the address information received by said third reception means with the address information received by said second reception means; and
said transmission means transmits the address information provided by said replacement means to said second module.

10. The information processing apparatus as claimed in claim 7, wherein
the processing means collects operation information of the first module based on the processing information;
the processing means transmits to the second module the operation information and a transfer request for transferring the operation information to the external system; and
the second module transfers the operation information transmitted by the processing means to the external system via the network in accordance with the transfer request.

11. An information processing apparatus capable of executing a plurality of functions by having a plurality of modules and coupled to an external system via a network, comprising:
a first module, including:
a machine information preparation device that prepares machine information, and
a transmitter that generates a transfer request and transmits the transfer request and the machine information; and
a second module coupled to the first module and the external system, the second module including a transfer device that transfers the machine information transmitted by the transmitter to the external system based on the transfer request, wherein the machine information pertains to a fault information of a fault occurring in the first module.

12. An information processing apparatus capable of executing a plurality of functions by having a plurality of modules and coupled to a network, comprising:
a first module that includes a processor that performs processing based on processing information;
a second module coupled to the first module and the network, the second module including:
a receiver that receives the processing information and a transfer request from the network, and a transfer device that transfers the processing information received from the network to the first module for use by the processor based on the transfer request, wherein the processing information pertains to a software or a software patch to be processed in the first module.

13. An information processing apparatus capable of executing a plurality of functions by having a plurality of modules and connected to an external system via a network comprising:

a first module; and a second module connected to the external system and with said first module, wherein:

said first module comprises:

preparation means for preparing information of said first module to be transmitted to the external system in a format in which the external system recognizes the information, and first transmission means for transmitting to said second module the information of said first module prepared by said preparation means and a transfer request for transferring the information of said first module to the external system to said second module;

said second module comprises:

first transfer means for transferring the information of said first module transmitted by said first transmission means to the external system via the network in accordance with the transfer request; and said first transmission means transmits the transfer request to the second module when a failure occurs in the first module, wherein the information pertains to a fault information of a fault occurring in the first module.

14. The information processing apparatus as claimed in claim 12, wherein:

said second module further comprises:

second transmission means for transmitting address information indicating an address of said first transfer means to said first module;

said first module further comprises:

first reception means for receiving the address information transmitted by said second transmission means, and first storage means for storing the address information received by said first reception means; and said first transmission means transmits the information of said first module and the transfer request to the external system to the address indicated by the address information stored in said first storage means.

15. The information processing apparatus as claimed in claim 13, wherein:

said first module further comprises:

second reception means for receiving information and a request for transferring the information to the external system from a different module connected to the first module, and second transfer means for transferring the information and the request for transferring the information to the external system received by said second reception means to said second module.

16. The information processing apparatus as claimed in claim 14, wherein:

said first module further comprises:

second transmission means for transmitting address information indicating an address of said second transfer means to the different module.

17. The information processing apparatus as claimed in claim 13, wherein:

said second module further comprises second storage means for storing address information indicating an address of the external system, and said first transfer means transfers the information of the first module to the address indicated by the address information stored in said second storage means.

18. The information processing apparatus as claimed in claim 13, wherein said first module further comprises third storage means for storing address information indicating an address of the external system, and said first transfer means transfers the information to the address indicated by the address information stored in said third storage means.

* * * * *